(12) United States Patent
Nagatsu et al.

(10) Patent No.: US 6,626,590 B1
(45) Date of Patent: Sep. 30, 2003

(54) OPTICAL COMMUNICATION NETWORK

(75) Inventors: Naohide Nagatsu, Yokosuka (JP); Masafumi Koga, Yokosuka (JP)

(73) Assignee: Nippon Telegraph and Telephone Corporation (JP)

( * ) Notice: Subject to any disclaimer, the term of this patent is extended or adjusted under 35 U.S.C. 154(b) by 0 days.

(21) Appl. No.: 09/455,463

(22) Filed: Dec. 6, 1999

(30) Foreign Application Priority Data

| Dec. 8, 1998 | (JP) | 10-349151 |
| Feb. 5, 1999 | (JP) | 11-029374 |

(51) Int. Cl.⁷ .............................................. H04B 10/20
(52) U.S. Cl. .......................... 398/59; 398/82; 398/83; 398/9; 398/45; 398/50; 398/91; 398/79; 398/87
(58) Field of Search .......................... 398/59, 82, 83, 398/9, 45, 50, 91, 79, 87

(56) References Cited

U.S. PATENT DOCUMENTS

| 5,488,500 A | 1/1996 | Glance |
| 5,600,473 A | 2/1997 | Huber |
| 5,959,749 A | * 9/1999 | Danagher et al. ........... 359/124 |

(List continued on next page.)

FOREIGN PATENT DOCUMENTS

| JP | 10-164025 | 6/1998 |
| JP | 11-10375 | 4/1999 |
| JP | 11-163911 | 6/1999 |
| JP | 2000-209244 | 7/2000 |

OTHER PUBLICATIONS

T. Shiragaki, et al., "Proposal for Bi–directional Path--switched WDM Self–healing Ring System", C&C Media Res. Labs, NEC Corporation, 2 pages (1998).

H. Shimomura, et al., "Wavelength–division add/drop multiplexer using a single wavelength–filter with back reflectors", C&C Media Res. Labs, NEC Corporation, 2 pages (1998).

(List continued on next page.)

*Primary Examiner*—Leslie Pascal
*Assistant Examiner*—Hanh Phan
(74) *Attorney, Agent, or Firm*—Burns, Doane, Swecker & Mathis, LLP

(57) ABSTRACT

A wavelength division multiplexing ring network is constructed using a simple architecture and a fewer number of hardwares between the nodes compared with the conventional ring network. Each node is structured so that any number of multiple waves can be processed, and a fault in the network or within a node is resolved by providing a path-based protection so that switching can be performed without disrupting other nodes or even within one node. The network uses two or four lines of optical fibers, and a half of the fibers are used for communicating in a clockwise direction and a other half of the fibers are used for communicating in a counter-clockwise direction to form a logical network by optical paths contained in optical fibers so as to provide an equal number of relay nodes between two adjacent pairs of nodes throughout the network, where each node includes: multiple optical add/drop circuits; an optical path transmit end and an optical path receive end for freely selecting and outputting multiple combinations of wavelengths to be inserted in each node; and transmission lines provided between the optical add/drop circuits and the optical path transmit end, as well as between the optical add/drop circuits and the optical path receive end for transmitting any multiple waves to be processed within the node so as to establish mutual communication by transmitting processed multiple waves to other nodes. This network design enables to reduce the number of connections between the optical path transmit and receive ends, and also to reduce the number of optical signal op termination circuits.

16 Claims, 16 Drawing Sheets

U.S. PATENT DOCUMENTS

| | | | | |
|---|---|---|---|---|
| 6,084,694 A | * | 7/2000 | Milton et al. | 359/124 |
| 6,091,869 A | * | 7/2000 | Sundelin | 385/24 |
| 6,137,603 A | * | 10/2000 | Henmi | 359/110 |
| 6,222,653 B1 | * | 4/2001 | Asahi | 359/110 |
| 6,278,536 B1 | * | 8/2001 | Kai et al. | 359/127 |
| 6,285,479 B1 | * | 9/2001 | Okazaki et al. | 359/133 |
| 6,351,323 B1 | * | 2/2002 | Onaka et al. | 359/110 |

OTHER PUBLICATIONS

T. Miyazaki, et al., "A Proposal of the optical–ring–switch circuit configuration with Bridge & Switch function", KDD R&D Laboratories, 2 pages (1998).

Nagata, "Comparison of TDM and WDM for Ring Networks", Telecommunications Division Hitachi Ltd., 2 pages, (1998).

D. Uehara, et al., "WDM Ring With a Traffic Classification Function", Proceedings of the 1998 IECE General Conference, The Institute of Electronics, Information and Communication Engineers, 4 pages ( Mar. 27–30, 1998).

* cited by examiner

FIG. 18 Prior Art

OPTICAL COMMUNICATION NETWORK

BACKGROUND OF THE INVENTION

1. Field of the Invention

The present invention relates to a wavelength division multiplexing network, and relates in particular to a communication network where multiplexed signal transmission lines are connected in a ring through a plurality of nodes that can be used to process multiple wavelengths. This technology enables to reduce the number of hardwares needed inside the node and simplify the system configuration, and enables to switch optical paths to bypass a fault, thereby enabling to continue operating the network even when the failure is within the node. The technology is particularly useful when a two-fiber bi-directional ring network has been serviced to its capacity, which can be increased by transforming the network into a 4-fiber directional ring network, without stopping the normal operation of the existing network.

2. Description of the Related Art

Conventional Technology 1

FIG. 15 is a schematic diagram of a WDM ring network, which is an example of the conventional wavelength multiplexing optical communication network. The WDM ring network is comprised by: nodes 901a~901e; optical fibers 902 serving as WDM transmission lines, an optical path 903a for providing normal optical communication through the optical fiber 902, and an optical path 903b contained in the optical fiber 902, which is used when problems develop in the optical path provided in the optical fiber 902. Here, the logical connection between each node is conducted using wavelengths as routing information, and these signal channels are called optical paths.

During the normal communication in this WDM ring network, WDM signals are input in the optical path 903a. In other words, optical signals input in node 901a are output from node 901c by propagating clockwise by way of node 901b.

Suppose that a fault 904 develops between the nodes 901a and 901b in the optical path 901, as shown in FIG. 16, signals cannot be propagated between the nodes 901a, 901b. Therefore, WDM signals entering node 901a are first propagated counter-clockwise through the nodes 901e, 901d, 901c and 901b, and are then propagated clockwise in the optical path 903b through the nodes 901b, 901c to be output from the node 901b.

FIG. 17 is a schematic diagram of an example of the general configuration of the WDM optical communication network, in which the node structure of a two-fiber unidirectional ring, that allows extraction/insertion (adding/dropping) of any wavelength, is applied to a two-fiber bi-directional ring.

This type of WDM optical communication network is reported, for example, in L. Berthelon et. al., Proc. GLOBECOM 96, pp. 311–315, 1996, or A Mariconda et. al., Proc. ECOC 96, ThD. Jan. 10, 1996. These articles describe a general structure for the application of the node structure of a two-fiber unidirectional ring, that allows processing of any wavelength, to a two-fiber bi-directional ring.

This type of WDM optical communication network is operated using single wavelength 2×2 optical switches that may include wavelength filters to enable extraction or insertion of waves, and the spectral source for different wavelengths is a fixed-wavelength source, and the system does not include a device for wavelength conversion. Also, in general, switching of optical path during circuit problems is considered in such ring networks, but in this discussion, switching is not considered for simplification. An example of switching is described later in Conventional Technology 2.

Node B (1000) in such a WDM optical network is connected to two adjacent nodes A and B having the same structure as the node B through optical fibers 911~914, and supplies M-channels (or channels) of a required wavelength to the optical paths in a full mesh configuration between the nodes. This WDM network is comprised by: optical add/drop circuits 1001, 1002 for processing at least N−1 waves of a given wavelength; and the optical add/drop circuits 1001, 1002 are provided with wavelength de-multiplexers 1003, 1004 for de-multiplexing M input waves of WDM signals; 2×2 optical switches $1005_1$ to $1005_{M/2}$; and optical couplers (or wavelength multiplexers) 1007, 1008.

Also, this WDM network is provided with optical path (op) termination circuits (transmit end and receive end) for selecting the optical paths, and the transmit end 1009 of the op termination circuit is provided with M pieces of fixed-wavelength light source $1010_1$~$1010_M$; M pieces of modulators $1011_1$~$1101_M$ for superimposing electrical signals on optical signals; and M lines of electrical input $1012_1$~$1012_M$ and the receive end 1013 of the op termination circuit is provided with M lines of photo-electric converter $1014_1$~$1014_M$ for converting optical signals of respective wavelengths to electrical signals; and M lines of electrical signal output $1015_1$~$1015_M$.

Here, optical fiber 911 contains optical signals input from node A, and optical fiber 912 contains optical signals input from other node C, and optical fiber 913 contains optical signals output to node C, and optical fiber 914 contains signals output to node A.

Bi-directional communication between node B and the other node is carried out in the following manner.

Here, the direction of nodes are defined such that A B C is clockwise (clock) and C B A is counter-clockwise. Also, for the counter-clockwise direction, the waves are used in the ascending order of refractive index stating from the lowest index using M/2 waves, and for the counter-clockwise direction, the waves are used in the descending order of refractive index starting from the highest index using M/2 waves. If the same wavelength is used in both directions, M/2 waves are sufficient number of waves required, but, for use in public networks, it is necessary to consider protection circuits, and in such cases, the remaining M/2 waves in each fiber is used generally for emergency use. Therefore, in this discussion, it is left as M-channels. Also, the reason for using different wavelengths for clockwise and counter-clockwise directions is to prevent wave collision for lines at the insertion circuit during switching operations, and this aspect of the circuit will be discussed later in the section related to Technology 2.

In a clock optical path from node B to another node, for example node C, one wave of the $\lambda_1$~$\lambda_{M/2}$ modulated by one of the electrical signal input $1012_1$~$1012_{M/2}$ is input in the optical insertion circuit 1001, and is output to optical fiber 913 through one of the optical switches $1005_1$~$1005_{M/2}$. On the other hand, an optical path from node C to node B is a counter-clockwise path, so that one wave of the $\lambda_{M/2+1}$~$\lambda_M$ is allocated, and it is input in optical fiber 912 into node B, and is output to the receiving end 1013 of the op termination circuit through one of the optical switches $1006_1$~$1006_{M/2}$ in the optical add/drop circuit 1002.

In this type of WDM network, to enable insertion/ extraction of any wavelength at a node, it is necessary to be able to process each M-channels in the optical add/drop multiplexing circuit (OADM), as well as to couple all the 2M-channels multiplexed by the two wavelength de-multiplexers to the op termination circuit. Therefore, in order to produce an optical path using any wavelength, it is necessary to provide a modulator in each of the transmit ends of the op termination circuit of all the 2M-channels, and in order to receive any wavelength of the 2M-channels, it is necessary for each of the receive ends of the op termination circuit to have an op termination circuit.

The above configuration has an advantage of offering logical connectivity between the nodes, that is, it does not restrict the traffic distribution pattern, however, assuming that the network is in a full mesh configuration, which is a typical logical connectivity between the nodes N, each node needs to process N−1 channels of the 2M-channels, so that the number of coupling lines between the OADMs and op termination circuits as well as the number of modulators and the op termination circuits are quite redundant compared with the necessary number of channels N−1.

Also, even if a ring network contains a large number of optical paths greater than the number corresponding to a full mesh configuration, the number of waves that each node needs to process is of the order of N, compared with the number of channels M, which is of the order of $N^2$ in this case, so that the overall system design is highly redundant.

Also, to solve these problems, multiple of optical signal transmission lines containing individual channels branched in the OADM must be manually connected to the required number of op termination circuits, and the optical signal transmission lines containing individual channels to be inserted in the OADM must be manually connected to the required number of modulators, so that it has been difficult to process individual channels automatically.

Conventional Technology 2

Figure 18:
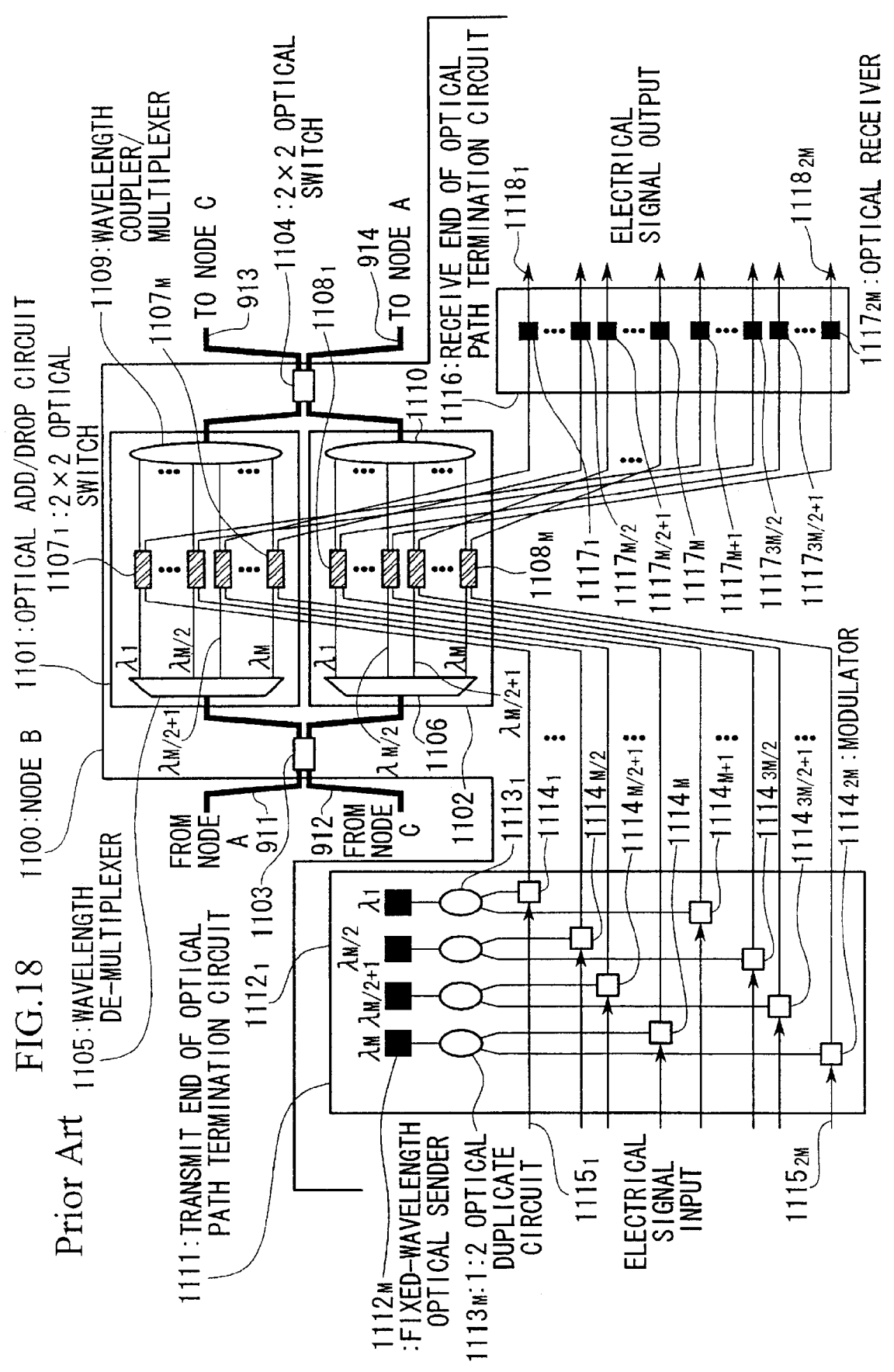

FIG. 18 is a schematic diagram of another example of the conventional WDM network having switching functions, and includes: node B (1100) provided with a WDM network, optical fibers 911~914 connecting adjacent nodes A and C of the same structure as node B; 2×2 optical switches 1103, 1104 for switching of WDM signals in units of M-channels between the fibers, and provide full mesh optical paths among the nodes for necessary M-channels.

This WDM network is provided with optical add/drop multiplexing circuits (OADM) 1101, 1102 for processing at least N−1 waves of any wavelength, and the circuits 1101, 1102 include: respective wavelength de-multiplexers 1105, 1106, 2×2 optical switches $1107_1$~$1107_M$, $1108_1$~$1108_M$ for processing one wavelength; and wave couplers (or wave multiplexers) 1109, 1110 for multiplexing M-channels.

This WDM network is operated by the op termination circuits 1111, 1116 for selecting optical paths, in which the transmit end 1111 has M pieces of fixed wavelength spectral source $1112_1$~$1112_M$ each emitting different wavelengths, M pieces of 1:2 duplication circuits $1113_1$~$1113_M$ for duplicating output signals from the fixed wavelength light source $1112_1$~$1112_M$; 2M pieces of modulators $1114_1$~$1114_{2M}$ for superimposing electrical signals on optical signals; and 2M lines of electrical signal input $1115_1$~$1115_{2M}$. The receive end 1116 of the optical path (op) termination circuit has 2M pieces of photo-electric converters $1117_1$~$1117_{2M}$ and 2M lines of electrical signal output $1118_1$~$1118_{2M}$.

Of the modulators $1114_1$~$1114_{2M}$, modulators $1114_{M/2+1}$~$1114_{3M/2}$ are reserve (protection) modulators, and of the 2M pieces of photo-electric converters $1117_1$~$1117_{2M}$ and $1117_{M/2+1}$~$1117_{3M/2}$ are protection signal op termination circuits.

In this case, optical fiber 911 contains optical signals input from node A, optical fiber 912 inserts optical signals input from other node C, optical fiber 913 contains optical signals to be output to node C; and optical fiber 914 contains optical signals to be output to node A. The 2×2 optical switches 1103, 1104 are arranged so that, when there is no circuit problems, optical signals input from node A are output to node C through the optical add/drop circuit 1101, and to transmit optical signals input from node C to node A through the OADM 1101.

When there is a problem, this WDM network is able to continue its operation without changing the wavelength in the faulty optical path using the two unidirectional lines having different allocated wavelengths between certain bi-directional lines.

In this example, signal transmission from node A to node B, that is, clockwise signals use $\lambda_1$~$\lambda_{M/2}$ during the normal operation while $\lambda_{M/2+1}$~$\lambda_M$ are used during the problem period. Signal transmission from node B to node A, that is counter-clockwise signals use $\lambda_1$~$\lambda_{M/2}$ during the problem period, and during the normal operation, $\lambda_{M/2-1}$~$\lambda_1$ are used. Here, $\lambda_1$ and $\lambda_{M/2+1}$ respectively are allocated to clockwise path and counter-clockwise path, and similarly, $\lambda_{M/2}$ and $\lambda_M$ are allocated to clockwise path and counter-clockwise path, respectively, between the nodes. During the normal operation, two fibers both transmit M/2 channels of WDM signals.

Switching operation of the above WDM circuit will be illustrated with reference to FIGS. 16 and 18.

In this ring network, when a fault 904 develops, switching is based on changing an entire WDM section containing all the optical paths that include the faulty fiber having the fault 904 in the faulty line 904a, by isolating the end nodes $^{901}a$, 901b at the 2×2 switches 1103, 1104 to switch the optical signals input in the problem node.

For example, if a fault develops between node B and node A, optical switch 1103 changes the optical path of output signals ($\lambda_{M/2+1}$~$\lambda_M$) from node C, input through the fiber 912, so as to input the signals in the OADM 1101. Therefore, the wavelengths ($\lambda_{M/2+1}$~$\lambda_M$) that should be terminated at node B are coupled, and the wavelengths ($\lambda_1$~$\lambda_M$) that should be inserted at node B is inserted, and are output to node C through the optical switch 1104. At this time, there is no need for the optical switch 1104 to change line.

Also, of the wavelength ($\lambda_1$~$\lambda_M$) to be inserted at OADM 1101, the wavelengths ($\lambda_{M/2+1}$~$\lambda_M$), that should have been modulated in the modulators $1114_{3M/2+1}$~$1114_{2M}$, inserted in the OADM 1102, and output to optical fiber 914 through the optical switch 1104, are input in OADM 1101 by operating the reserve modulators $1114_{M/2+1}$~$1114_M$. In the add/drop circuit 1101, the inserted wavelengths ($\lambda_1$~$\lambda_{M/2}$) do not collide with the new wavelengths to be inserted ($\lambda_{M/2+1}$~$\lambda_M$).

In the meantime, the wavelengths ($\lambda_1$~$\lambda_{M/2}$), input in node A and should have been coupled at node B, are switched and input in node C, and are converted to electrical signals in the reserve photo-electric converters $1117_{M+1}$~$1117_{3M/2}$ used protection.

According to the method of emergency operation in this WDM network, because network protection is based on looping back the signals in units of optical multiplexing section (OMS protection) between the nodes 901a, 901b, which are the nodes at both ends of the fault X, the number of sections between the nodes that are required to bypass the problem section are increased significantly. For example, the maximum number of sections is 3(N−1)/2 for an odd number of nodes N, and 3N/2−1 for an even number of nodes N. It results in operational problems such as increased distance for optical paths, signal delays and requirement for increased number of repeater stations, resulting that it is difficult to design a large-scale network.

Also, in this WDM network, in order to prepare for equipment failures involving modulators and add/drop circuits, it is necessary to duplicate the number of devices to process individual waves in the op termination circuits, in addition to devices such as 2×2 switches 1103, 1104 that are used during the emergency.

Further, because switching is based on units of WDM sections, even when only a part of the optical paths in a WDM section is faulty, it is necessary to switch the entire section including the normal unaffected optical paths.

Accordingly, conventional WDM network using conventional node apparatus presented the following problems in processing multiple waves having a plurality of wavelengths.

(1) When a single wavelength is used to transmit optical data between an optical add/drop circuit and an op termination circuit, the number of optical signal transmission lines required is equal to (M-channels·number of fibers between nodes).

(2) M pieces of photo-electric converters are required in the receiving end of the op termination circuit in order to process N−1 waves of the M-channels.

(3) In order to solve these problems, it is necessary to manually connect the lines between the processing circuits and op termination circuits as well as between the light source and switches within the optical path termination circuit.

(4) Emergency switching operation is based on units of WDM signals propagating in multiple optical paths contained in one fiber, therefore, it is necessary to provide loop-back lines at both nodes surrounding a fault, thereby resulting in long length of optical paths and presenting a deterrent to designing a large-scale network.

(5) The 2×2 switch for switching the WDM signals cannot continue to function when there is a fault within the node.

To resolve these problems, it is necessary to provide devices additional to the 2×2 switch to perform switching for each wave.

Also, if such configuration is adopted, it is necessary to provide switches to change from the normal wavelengths to respective protection wavelengths for all M-channels for both transmit end and receive end of the op termination circuit.

SUMMARY OF THE INVENTION

It is an object of the present invention to provide an optical communication network, based on a wavelength division multiplexing (WDM) method, in which the optical paths are connected by the nodes in a ring architecture, which enables to process any number of waves through the nodes, to reduce the requirement for the number of hardwares, and to simplify the structure of the network. In the present ring network, emergency operation is based on switching of optical paths for network protection so that problems within a node can also be resolved.

The object has been achieved in a wavelength division multiplexing network, based on a plurality of lines of optical fibers to connect a plurality of nodes into a ring network architecture, using a half of the fibers for operating in a clockwise direction and a remaining half of the fibers for operating in a counter-clockwise direction to form a logical network comprised by signal channels contained in individual fibers, wherein each node is comprised by a plurality of optical add/drop circuits; a transmit end which assigns waves to signal channels and sends them to the optical add/drop circuit, and a receive end which receives signal channels sent from the optical add/drop circuit; and transmission lines provided between said optical add/drop circuits and said transmit end, as well as between said optical add/drop circuits and said receive end for transmitting any multiple waves to be processed within said node so as to establish mutual communication by transmitting processed multiple waves to other nodes.

A first aspect of the network connected in a plurality of lines of optical fibers architecture is summarized as follows that the optical add/drop devices (OADM) are capable of processing many wavelengths, and WDM transmission lines carry optical signals between the OADMs and transmit/receive ends of the optical termination circuits that select the optical paths for respective multiplexed optical signals.

In a specific example, if it is supposed that the network is comprised by N nodes, and M-channels (waves) are required to connect the network in a full mesh configuration, in which the sending side of each node must be structured so as to able to select N−1 waves from the M-waves, and the selected waves are input in the OADM through the WDM transmission lines and are transmitted to the receiver side of each node, where the multiplexed wave signals are de-multiplexed and individual signals are transmitted to the receive end of the optical termination circuit.

A second aspect of the network is that the capability of selecting N−1 waves from M-channels is achieved by providing M number of fixed wave sender groups combined with M×M' optical switches (where M'=N−1 for example), or by providing a tunable wave sender capable of sending the same number of waves that are needed to be selected.

In this example, the network parameter M is computed from $M=(N^2-1)/4$ for two fiber network, or $M=(N^2-1)/8$ for four fiber network, therefore, it is recognized that the number of waves to be inserted in each node is less than the number of channels M required to provide a full mesh configuration, so that each node needs to process only the number of waves required for its own services. This approach reduces the amount of hardwares required within each node to match the number of waves to be processed in individual nodes.

A third aspect of the network is that the spectral source made up of M fixed wave optical sender groups and M×M' optical switches may be replaced with a number of fixed wavelength sender groups and an optical switch of a small scale.

In this case, when the number of nodes N within the network is high, which means that the required number of channels M is also high, it is not necessary to use a large-scale switching device emitting a single wave so that a small scale switch is acceptable. The network structure is configured so that the network capacity can be increased by adding a required number of small-scale fixed wave senders according to the number of optical paths to be processed by individual nodes.

A fourth aspect of the network is that, when a fault is developed within a ring network, ring network operation can be continued by providing a switching capability to switch only those optical paths that are faulty.

In this case, each node is provided with an optical path protection capability to switch transmission of optical signals on the basis of the optical path, so that problems within the node can be resolved individually. Furthermore, compared with the problem in the conventional section-based protection, it is possible to prevent an increase in the line length for protection optical paths.

A fifth aspect of the network is that increased demand for network services is resolved by providing extra-traffic lines using protection waves, which are reserved for emergency use, for the normal communication services.

In this case, a wave emitted from an optical sender is duplicated, and one signal is transmitted through the optical path due to normal information, and other signal is transmitted through a new optical path due to extra-traffic information. When a fault is developed in the normal optical path, extra-traffic path is interrupted and channels are released for use in the faulty path to continue operating the network.

According to the network described above, for a full mesh configuration, the number of waves to be selected within a node is much less than the necessary number of channels required within the network (by a factor of $1/N^2$ of the necessary number of waves) so that, the minimum number of waves to satisfy the customer needs can be selected from the optical path termination circuit while maintaining the performance level, thereby reducing the number of hardwares required within each node. Also, by using WDM transmission lines for transmitting multiple waves between the OADMs and optical path termination circuits, the number of optical signal lines between the OADMs and optical path termination circuits can be reduced.

Also, by establishing a full mesh configuration using WDM transmission lines between the nodes, not only the number of optical fibers needed for connection is reduced, but the wave utilization efficiency is increased in each node. Thus, the ring network can be operated at its optimum efficiency.

Network protection is based on switching an optical path containing a fault, therefore, problems inside the node (such as problems in optical path termination circuits or OADMs) can be resolved. The optical path length is also reduced so that ring network having a larger ring radius can be designed using lesser number of relay stations.

During the normal operation of the network, protection waves can be used to carry extra-traffic information, so that wave utilization efficiency is increased and also different qualities of services can be offered within one ring network.

A sixth aspect of the network is that by increasing the network capacity on the basis of 2F-BR architecture, the enlarged network can be operated to meet the increased demand by the separating the WDM transmission lines into emergency-waves for use only during the emergency and normal-use waves for use only during the normal operation so that the increased capacity network is operated as a 4F-BR ring network.

In this case, the waves processed by the OADMs are separated into normal-use waves and emergency-use waves, and these waves are transmitted through separate WDM transmission lines for processing by the respective OADMs.

Therefore, even when the network is operated in the 2F-BR mode, the separation of protection path means that the normal mode of operation is less likely to be affected because all the processing devices are separated.

Accordingly, network capacity increase can be provided economically by operating the system as a 2F-BR network initially, and gradually adding another 2F-BR network when all the waves are utilized.

Also, when increasing the capacity, the new network may be based only on emergency-use waves so that the WDM transmission lines are comprised by separate lines of normal-use waves and emergency-use waves. Therefore, the normal service can be continued if a fault is developed within the WDM line using the emergency-use waves or inside the node itself, normal services are not disrupted at all.

Connection switching is performed without stopping the operation of the normal-use optical paths An advantage of this network is that the emergency waves may be used for information different from the normal information, i.e., to transmit extra-traffic information.

The extra-traffic information line can be stopped when adding a new service or if a fault is developed in the network, so that two different quality services can be offered thereby providing flexibility to the users.

As explained above, by means of the present invention, by means of making individual optical paths switching units, it is possible to reduce the transmission distance of an optical path during failure, and by means of a mechanism which carries out switching of optical path units, it is possible to respond to failure within nodes.

In addition, by means of the wave selection function provided in transmit ends, it is possible to efficiently utilize wave resources by means of reduction in the scale of couplers, reduction in modulators, addition of wave senders and wave selectors or tunable wave senders, and full mesh connection between nodes.

It is possible to reduce the scales of the optical couplers (multiplexers and de-multiplexers) and the number of modulators required. Increase in the number of wave senders and selectors as well as increase in the number of tunable wave senders are possible so as to connect in a full mesh configuration so that the resource utilization efficiency is significantly improved compared with the conventional network configurations.

All of the above aspects of the present invention contribute to reduction in the physical size of the optical path termination circuits so that a large-scale network can be designed economically and efficiently.

When the extra-traffic service is offered, two quality levels of communication services can be provided within one network.

Also, by separating the waves to be processed in the OADM into two groups, normal-use waves and emergency-use or extra-traffic waves, the maximum scale of wave couplers and multiplexers in the optical termination circuit can be halved.

By controlling such wave couplers and multiplexers separately as normal-use devices and emergency-use devices or extra-traffic devices, normal communication services will not be affected at all even if failures are experienced in any of the devices used for emergency or extra traffic.

When the network capacity is increased, it is only necessary to switch connections for the emergency-use lines or extra-traffic wave lines so that normal-use lines are not affected at all.

By carrying out such switching of connections to produce a 4F-BR network, normal-use wave group and emergency-use group or extra-traffic wave group are all contained in separate WDM transmission lines so that the normal operation of the network is not affected by disruptions caused by optical path failures, or problems in the WDM lines transmitting multiplexed optical signals due to emergency-use waves or extra-traffic waves.

Similarly, OADMs are also provided for separate wave groups for emergency-use and extra-traffic use so that, so long as separate input/output lines are provided for each wave group, switching can be performed on the basis of single waves or M-channels without limiting the structure of the optical path termination circuits.

The result is that a high-performance ring-network can be constructed economically and efficiently by reducing not only the size and scale but cost of manufacturing each component, but by improving the network reliability significantly. Furthermore, optical path termination devices can be modified and selected depending on the local conditions of customer usage, thereby enabling to alter the configuration of any ring network according to any changes in the level of demand for additional services.

BRIEF DESCRIPTION OF THE DRAWINGS

FIG. 18 is a schematic diagram of an example of the WDM network having a conventional switching capability.

DESCRIPTION OF THE PREFERRED EMBODIMENTS

Preferred embodiments will be presented in the following with reference to the diagrams. In the following description of the invention, signals can be either optical signals or electrical signals, and "a wave" may refer to a channel dedicated to particular optical signal of a certain wavelength, or to optical signals of a given wavelength.

Optical communication systems presented in the following are based on the following parameters: N nodes are connected by two or four optical fibers between two nodes in a ring-shape; a half of the fibers are used for transmitting clockwise optical pulses and the other half are used for counter-clockwise optical pulses; each node is connected in a full mesh configuration or higher, using, a minimum of M-channels (where $M=(N^2-1)/4$ for two fibers, and $M=(N^2-1)/8$ for four fibers where $N=2k, 2k+1$ and k is an integer greater than 1); each optical path is identified by a particular wavelength; and the number of relay nodes between two nodes in bi-directional communication is the same. However, such parameters of the network system are not limited to those specified. Here, in the same way as in the above-mentioned conventional art, the logical connection between each node is conducted using wavelengths as routing information, and these signal channels are called optical paths.

Also, in various diagrams, those parts that have the same structure are given the same reference designations, and their explanations are not repeated.

Embodiment 1

Figure 1:
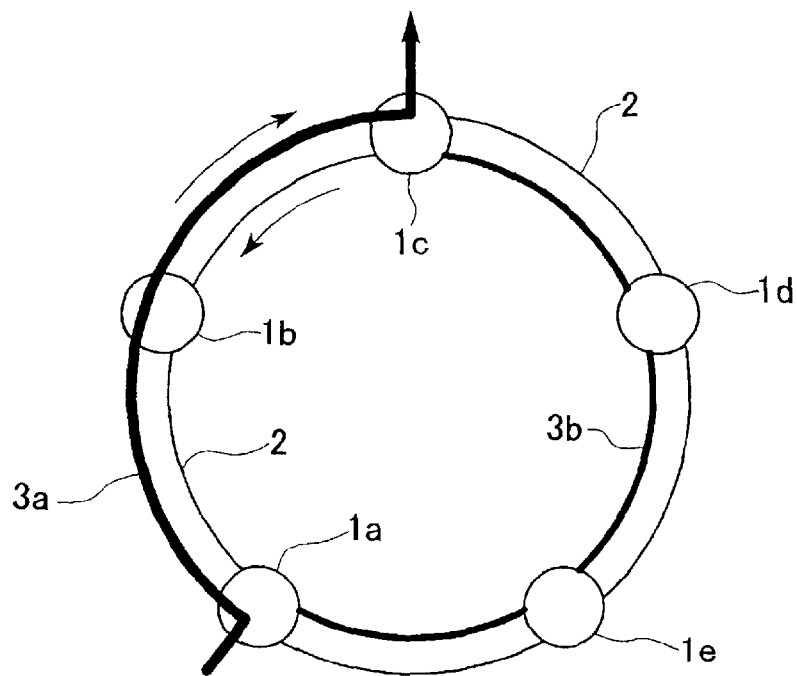
FIG. 1 is a schematic diagram of the WDM ring network in Embodiment 1.

FIG. 1 is a schematic diagram of a WDM ring network in Embodiment 1 including: nodes 1a~1e; optical fiber 2; working (optical) line 3a contained in fiber 2 which is used for the normal operation; a reserve optical path contained in fiber 2 which is a protection path for emergency operation.

In this WDM ring network, WDM signals are transmitted through the working path 3a during the normal operation, that is, optical signals input in node 1a is output from node 1c in the clockwise direction through node 1b.

Figure 2:
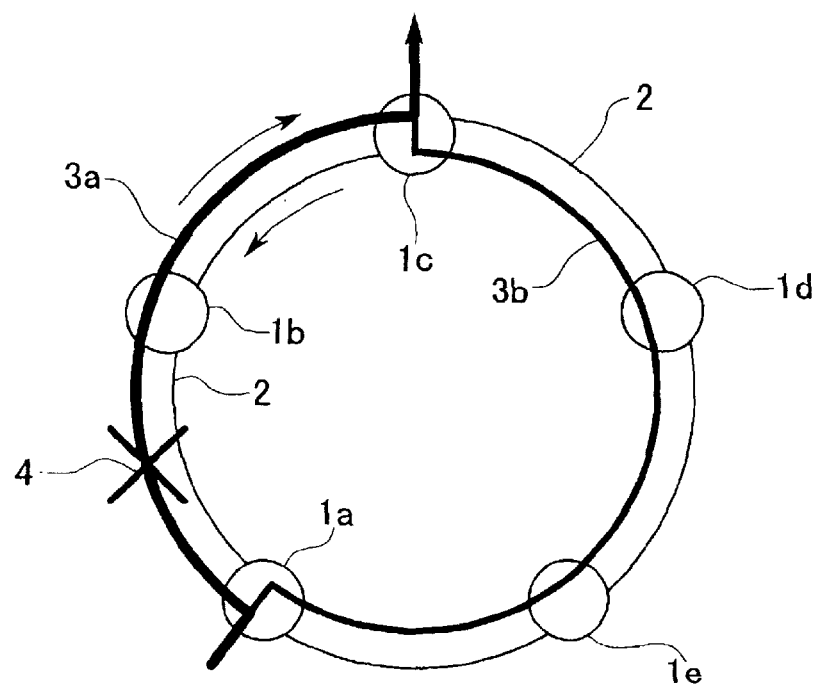
FIG. 2 is a d schematic diagram to show the operation of the ring network in Embodiment 1.

When a fault 4 develops between nodes 1a, 1b in the working line 3a, as shown in FIG. 2, nodes 1a, 1b become inoperable so that an optical path (OP) is changed to counter-clockwise direction from node 1a to 1c through node 1d in a protection path 3b.

Figure 3:
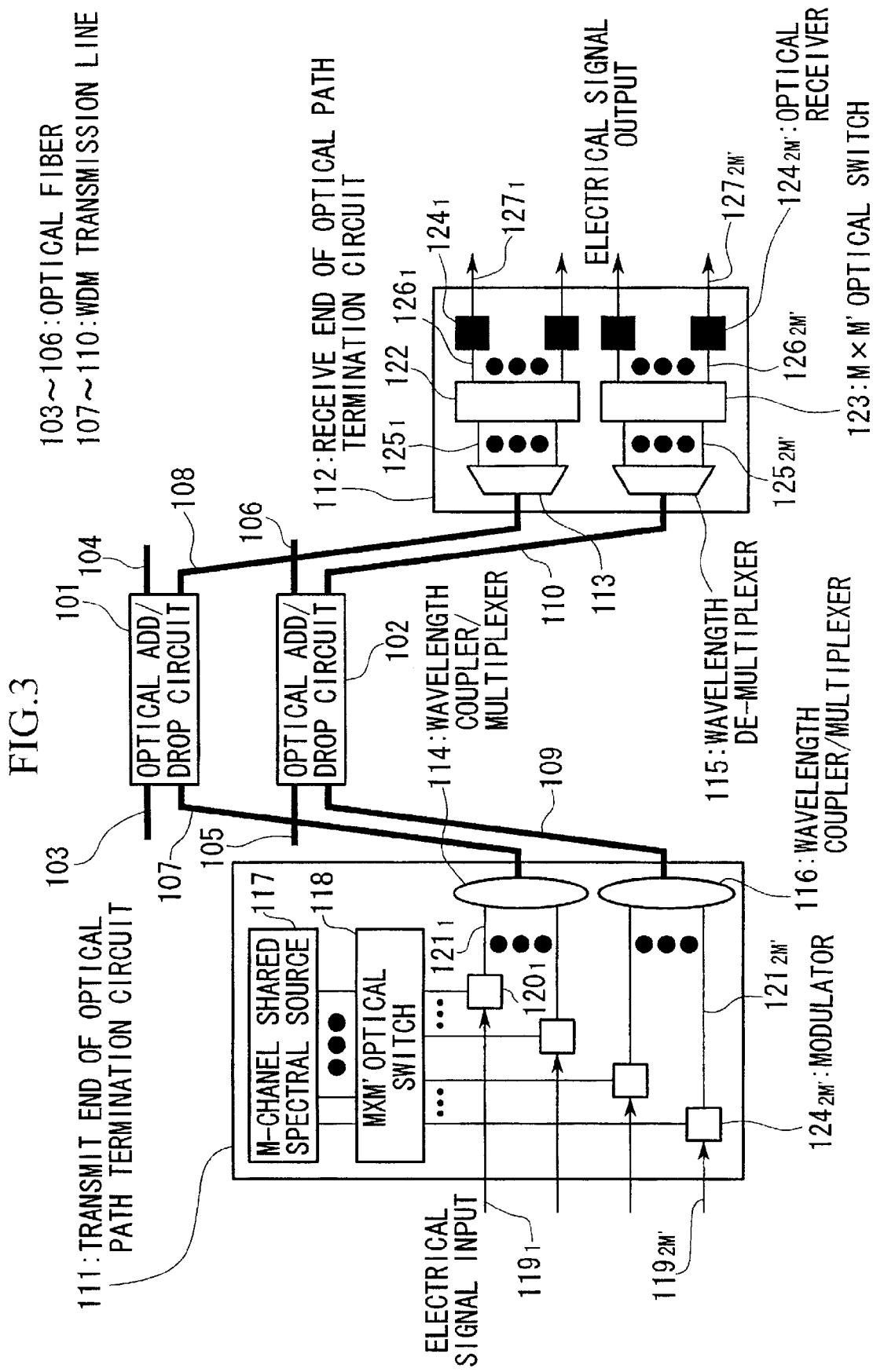
FIG. 3 is a schematic diagram to show the structure of the node in the ring network in Embodiment 1.

FIG. 3 is a schematic diagram of the structure of a node in the present WDM ring network of 2F configuration having two fibers between the nodes. This structure is derived by executing the capabilities for selecting wave generation and wave selection provided in the op termination circuit of the WDM optical network having the optical add/drop circuit disclosed in claim 10 and the WDM transmission line disclosed in claim 11, by using a combined effect of the M-channel shared spectral source and the optical switch disclosed in claim 2.

This network is comprised by: optical fibers 103~106 (correspond to conventional optical fibers 2101~2104) connecting the optical add/drop multiplexers (OADM) 101, 102 with the two adjacent nodes; transmit end 111 and receive end 112 of the op termination circuit, and WDM transmission lines 107~110 connecting the OADM transmit/receive ends 111/112, and the OADM 101, 102.

The OADM 101 performs the following operations optical signals transmitted from an adjacent node through the optical fiber 103 are branched, and branched signals are transmitted to wavelength de-multiplexer 113 in the receive end 112 of the op termination circuit using the WDM line 108; in the meanwhile, multiple waves selected by the transmit end 111 and transmitted through the WDM line 107 by way of the optical coupler 114 are inserted, and the modulated signals are delivered to another node.

The OADM 102 performs the following operations: optical signals transmitted from an adjacent node through the optical fiber 105 are branched, and branched signals are transmitted to wavelength de-multiplexer 115 in the receive end 112 of the op termination circuit using the WDM line 110; in the meanwhile, multiple waves selected by the transmit end 111 and transmitted through the WDM line 109 by way of the optical coupler 116 are inserted, and the modulated signals are delivered to another node.

Here, optical fibers 103, 105 input optical signals received from respective different adjacent nodes.

Next, the function and structure of the op termination circuit (specifically, the transmit end 111 and receive end 112 of the op termination circuit) will be explained in detail.

The transmit end 111 comprises: an M-channel, shared spectral source 117; an optical switch 118 having an channel input scale of M×M' (M≧M'≧N−1) produced by the source 117; modulators $120_1$~$120_{2M'}$ for superimposing information due to electrical signal input $119_1$~$119_{2M'}$ on respective waves output from the optical switch 118; optical signal transmission lines $121_1$~$121_{2M'}$ for transmitting waves having the superimposed information; and optical couplers 114, 116 for wavelength multiplexing the information signals.

The receive end 112 comprises: de-multiplexers 113, 115 for de-multiplexing WDM signals transmitted from the respective OADM 101, 102; M×M' optical switches 122, 123 where (M≧M'≧N−1) for directing the de-multiplexed signals to respective paths; photo-electric (p-e) converters $124_1$~$124_{2M'}$ for converting respective waves output from the M×M' optical switches 122, 123 into electrical signals; wavelength de-multiplexers 113, 115; optical signal transmission lines $125_1$~$125_{2M'}$ and $126_1$~$126_{2M'}$ for transmitting optical signals between the wavelength de-multiplexers 113, 115 and the p-e converters $124_1$~$124_{2M'}$; and electrical signal output $127_1$~$127_{2M'}$ for outputting electrical signals converted in the p-e converters $124_1$~$124_{2M'}$.

Next, the features of the present ring network will be explained using an example in which the number of nodes N=15.

The necessary number of waves M for connecting the nodes in a full mesh configuration in the 2F-BR architecture is given by M-($N^2$−1)/4, and when N–15, M is 56. In each node, in order to communicate with the other 14 nodes, it is necessary to process 14 waves. In other words, in FIG. 3, of the 112 waves (56×2) input by the optical fibers 103, 105, fourteen waves are processed by the OADM 101, 102, and are forwarded to the op termination circuit. In the transmit end 111 of the op termination circuit, fourteen waves having the same wavelengths as the processed fourteen waves are selected and inserted in the OADM 101, 102, and are transmitted to the two adjacent nodes using optical fibers 104, 106.

In this embodiment, the fourteen waves to be processed are separated into 7 waves each, and optical signals containing 7 waves are input through the fibers 103, 105. Similarly, optical signals containing other 7 waves are output through the fibers 104, 106.

Here, the M×M' optical switch 118 in the receive end 111 of the op termination circuit selects only the desired N−1 (=14) waves from the M (=56) waves and forwards them to the modulators $120_1$~$120_{2M'}$. And, the M×M' optical switches 122, 123 output respective processed waves to the desired p-e converters $124_1$~$124_{2M'}$. The use of the M×M' optical switches enables to reduce M pieces (of the order of $N^2$), which represents the number of modulators and optical path termination circuits that are required for the conventional architecture to (N−1) pieces. Similarly, M pieces of de-multiplexers and couplers that are necessary to process M-channels have now been reduced to N−1 pieces.

In this embodiment, a full mesh configuration is obtained for N=15 and the number of necessary waves M=56 for a full-mesh configuration, but in a network system having a capability of servicing more than that number of channels, for example M=64, it is possible to provide more than a full mesh configuration in 15 nodes. In such a case, it is possible to process more than N−1 waves in each node. Even in such a case, the number of pieces of modulators and p-e converters required in each op termination circuit can be limited to the order of N rather than the order of $N^2$ in the conventional system. Similarly, the scale of the wavelength de-multiplexers and optical couplers can be limited to the order of N.

The system of this embodiment therefore can provide advantages such as lowering in the scale of optical couplers reduction in the number of modulators, lowering in the scale of wavelength de-multiplexer, reduction in the number of photo-electric converters, reduction in the number of coupling lines between the transmit end and receive end of the optical path termination circuits, among others. It therefore, enables to reduce the physical scale of the op termination circuit as well as the costs of operating the op termination circuits.

As demonstrated above, the input signal scale for the optical switches required by the transmit and receive ends of the op termination circuits to connect N nodes in a full mesh configuration is M×(N−1) and M'=N−1. Therefore, by arranging the system so that M=M', the number of signal termination circuits, the number of modulators and photo-electric converters in the present system can be made to be equivalent to the conventional system. The output from the optical switches does not need to be M lines, it is only necessary that it can select N−1 waves.

Also, so long as the structure can output M-channels, any logical connection method may be accommodated. In this case also, output waves can be minimized to correspond with each logical connection method.

Further, this embodiment can be applied to four-fiber bi-directional ring network. In such a case, the WDM transmission lines, optical couplers, wavelength de-multiplexers are each divided in half, and the divided optical coupler and de-multiplexers are arranged so as to enable to multi/de-multiplex at least (N−1)/2 wavelengths, and provide WDM lines for transmitting multiplexed wave signals between the OADM and the op termination circuit so that, of the M-channels (($N^2$−1)/8), at least (N−1)/2 channels will be processed.

Embodiment 2

Figure 4:
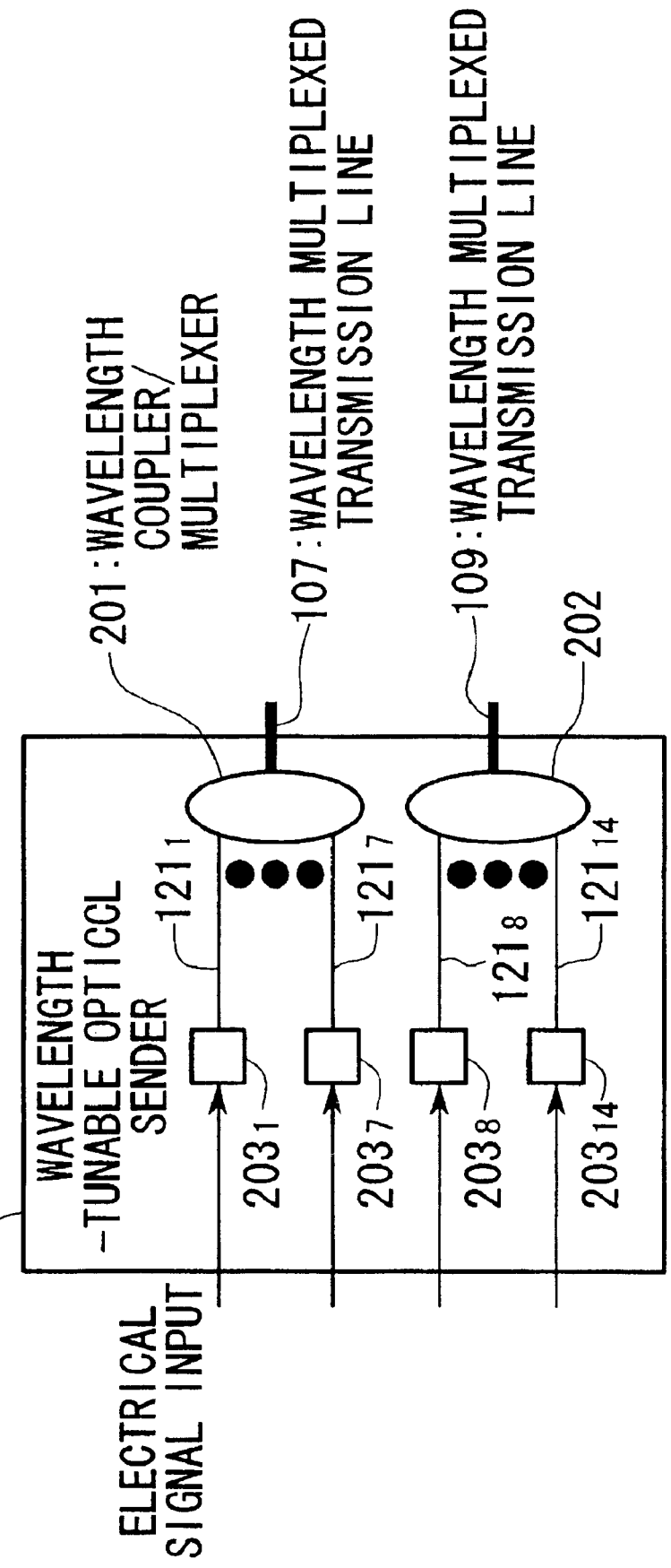
FIG. 4 is a schematic diagram of the transmit end of the optical path (op) termination circuit in the network in Embodiment 2.

FIG. 4 is a schematic diagram of the transmit end of the optical path (op) termination circuit WDM network in Embodiment 2 relating to a network using the two-fiber architecture, and is an example of using the wavelength tunable source disclosed in claim 3.

The transmit end 111a of the op termination circuit comprises: wavelength tunable optical senders $203_1$~$203_{14}$ capable of multiplexing M-channels, optical signal transmission lines $121_1$~$121_{14}$ for transmitting respective waves having the superimposed information, and optical couplers 201, 202 (or wavelength multiplexers) for wavelength multiplexing the information signals. The optical couplers 201, 202 are connected to WDM transmission lines 107, 109 for transmitting respective optical signals to the respective OADM.

The features of the transmit end 111a of the op termination circuit will be explained for a case of N=15.

In this embodiment, fourteen waves in each node into the optical path to provide a full mesh configuration are selected independently in each of the fourteen wavelength tunable optical senders $203_1$~$203_{14}$. That is, each of the wavelength tunable optical senders $203_1$~$203_{14}$ outputs different wavelengths, and seven waves in each line are multiplexed in the respective wavelength multiplexers 201, 202. Accordingly, the benefits obtained in the network of this embodiment are the same as those in Embodiment 1, regarding reduction in the number of modulators and photoelectric converters, and lowering the multiplicity of the wavelength de-multiplexers and optical couplers.

The present embodiment can be applied to a 4F-BR network having four fibers between the nodes. In this case, each of the optical couplers 201, 202 and WDM transmission lines 107, 109 shown in FIG. 4 is divided into two, so that they can process at least $(N^2-1)/8$ waves to operate a WDM ring network.

Embodiment 3

Figure 5:
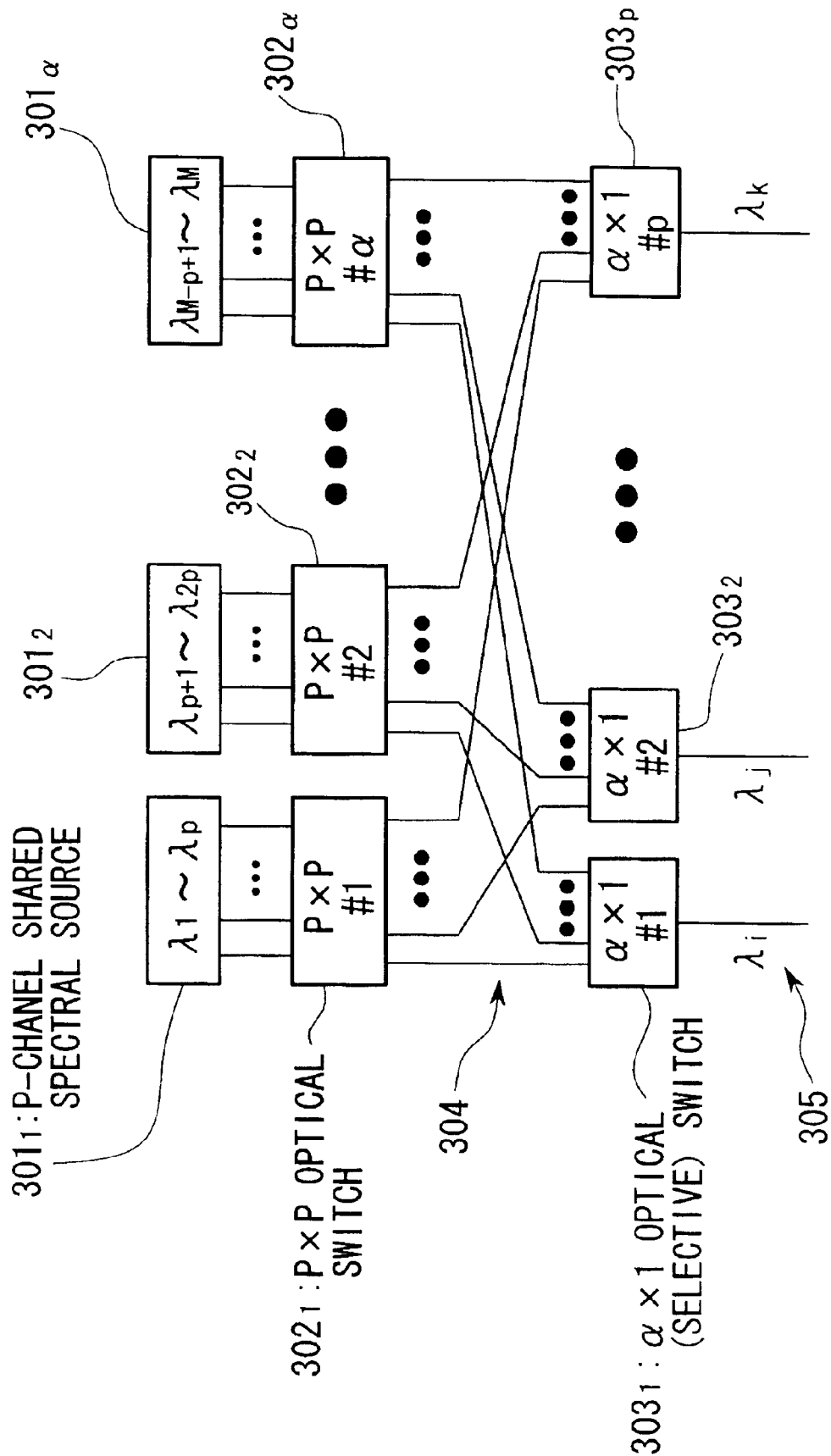
FIG. 5 is a schematic diagram of the transmit end of the op termination circuit in the network in Embodiment 3.
Figure 6:
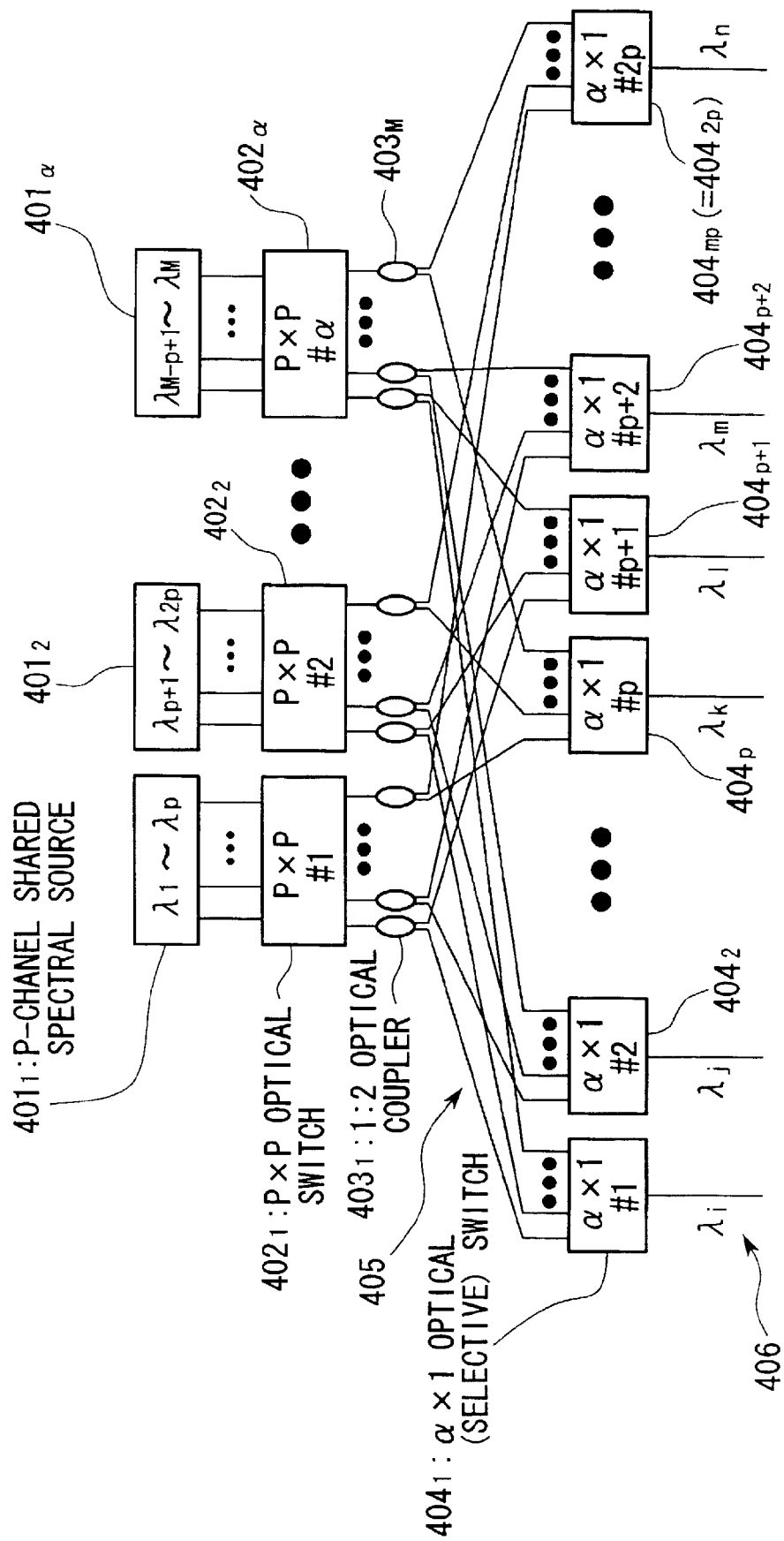
FIG. 6 is a schematic diagram of a modification of the transmit end of the op termination circuit in the network in Embodiment 2.

FIG. 5 is a schematic diagram of the transmit end of the WDM network in Embodiment 3, and FIG. 6 shows a modification of the transmit end and is an example of the wavelength source and wavelength selection circuit in the transmit end of the optical path (op) termination circuit in a ring network in which the nodes are connected by two or four optical fibers It is an example of the wavelength source and wavelength selection circuit in the transmit end of the op termination circuit disclosed in claim 4.

The wavelength source and wavelength selection circuit shown in FIG. 5 represent an example of dividing the M-wave, shared spectral source 117 and M×M' optical switch 118 described in Embodiment 1 into a number of devices, and is comprised by: α pieces of fixed-wavelength, shared spectral sources $301_1$~$301_\alpha$ for generating p waves of different wavelengths, α pieces of p×p optical switches $302_1$~$302_\alpha$ for producing p pieces of input/output optical signals; p pieces of α×1 optical (selective) switches $303_1$~$303_p$ to select one wavelength from an input of α waves, an optical signal transmission line 304 for connecting p×p switches $302_1$~$302_\alpha$ and α×1 optical switches $303_1$~$303_p$; and an optical signal transmission circuit 305 for outputting wavelengths selected by the α×1 optical switches $303_1$~$303_p$.

Here, if each individual shared source generates $M_i$ waves (i is an integer greater than 2), then the wavelength that can be generated overall is expressed as $SM_i$.

A modification of the wavelength source and wavelength selection circuit shown in FIG. 6 is an example of dividing the M-wave, shared source 117 and M×M' optical switch 118 into a number of devices as in the case shown in FIG. 5, and is comprised by: α pieces of fixed-wavelength shared source $401_1$~$401_\alpha$ for generating p waves of different wavelengths; α pieces of p×p optical switches $402_1$~$402_\alpha$ for processing p pieces of input/output optical signals; M pieces of 1; m optical couplers $402_1$~$402_\alpha$; m×p pieces of α×1 optical couplers $403_1$~$403_{m-p}$ to select one wavelength from an input of α waves, an optical signal transmission line 405 for connecting p×p switches $402_1$~$402_\alpha$ and α×1 optical switches $404_1$~$404_{m-p}$; and an optical signal transmission line 406 for outputting wavelengths selected by the α×1 optical switches $404_1$~$404_{m-p}$.

In FIG. 6, a case of m=2 is shown for simplification.

In this embodiment, the example is a case of dividing the fixed wavelength shared source into M-channels for simplicity so that the necessary numbers of waves M, p and α within a ring are related by an expression M=p×α, but the method of dividing the shared light source includes those case that do not satisfy this expression.

The features of this embodiment will be explained by using a case of N=15 for the number of nodes N, and the optical paths are distributed in a full mesh configuration in a 2F-BR architecture.

In this embodiment, fourteen waves are processed in each node. Also, the necessary number of waves in the network is 56. Here, if the network is comprised by 64 WDM transmission lines (M=64), then at least fourteen waves must be selected so that each node can communicate with others.

For example, in FIG. 5, if dividing of wavelength source and wavelength selective switch is carried out so that p=4 and α=16, it is possible to select any 16 waves in each node. Therefore, at least a full mesh configuration can be achieved.

Here, the values of above p, α are not unique, and p=8, α=8 can also be chosen. In such a case, each node can select any wavelength from eight waves, but a full mesh configuration cannot be established. Therefore, as shown in FIG. 6, 1:2 optical couplers $403_1$~$403_M$ are inserted between the p×p optical switches $402_1$~$402_\alpha$ and α×1 optical switches $404_1$~$403_{m-p}$, thereby enabling to establish a full mesh configuration by selecting a maximum of any sixteen waves.

Accordingly, by selecting the coefficient m so that a desired number of waves can be obtained for any combination of p, α, for example, it is possible to establish optical paths for any logical connectivity equivalent to the full mesh configuration.

In this embodiment, the wavelength selective switches are arranged so as to choose at least 14 waves to be established in a full mesh configuration within each node, but as disclosed in claim 5, by connecting the separate shared light source in a parallel configuration by using multiple optical switches, the shared spectral source can be increased gradually in the future.

In other words, if it is desired to establish a new optical path after the full mesh configuration has been reached in the existing nodes, it is only necessary to successively add a shared spectral source having the necessary number of channels. In this case, channels should be allocated so that, as much as possible, the necessary number of wavelengths required by each node is the same for all the nodes, so that it is possible to reduce the number of fixed wavelength shared source of p waves effectively to minimize the cost of adding the new optical path to the existing ring network.

Here, if the full mesh configuration is not necessary for all the nodes, it is sufficient to design the network so that each node can select only the desired number of waves (<14) In this case, it is possible to arrange so that the number of fixed wavelength shared source of p-channels is less than α. For example, at the beginning, only the shared light source having the required wavelengths is provided, and later, shared light source having wavelengths for future demand can be installed. In this case, wave allocation should be made so that the shared wavelengths are common to as many nodes as possible so that the number of fixed wavelength and shared light source of p-channels required will be minimized to reduce the cost of adding a new optical path to the existing ring network.

The approach of gradually adding wave sources and wave selection capabilities using the shared light source is applicable to a case disclosed in claim 3 using a tunable light source. In such a case, tunable light sources to correspond to the number of optical paths to be processed in each node should be allocated to the transmit end of the op termination circuit, and the required number of photo-electric converters should be allocated to the op termination circuit, as necessary.

Embodiment 4

Figure 7:
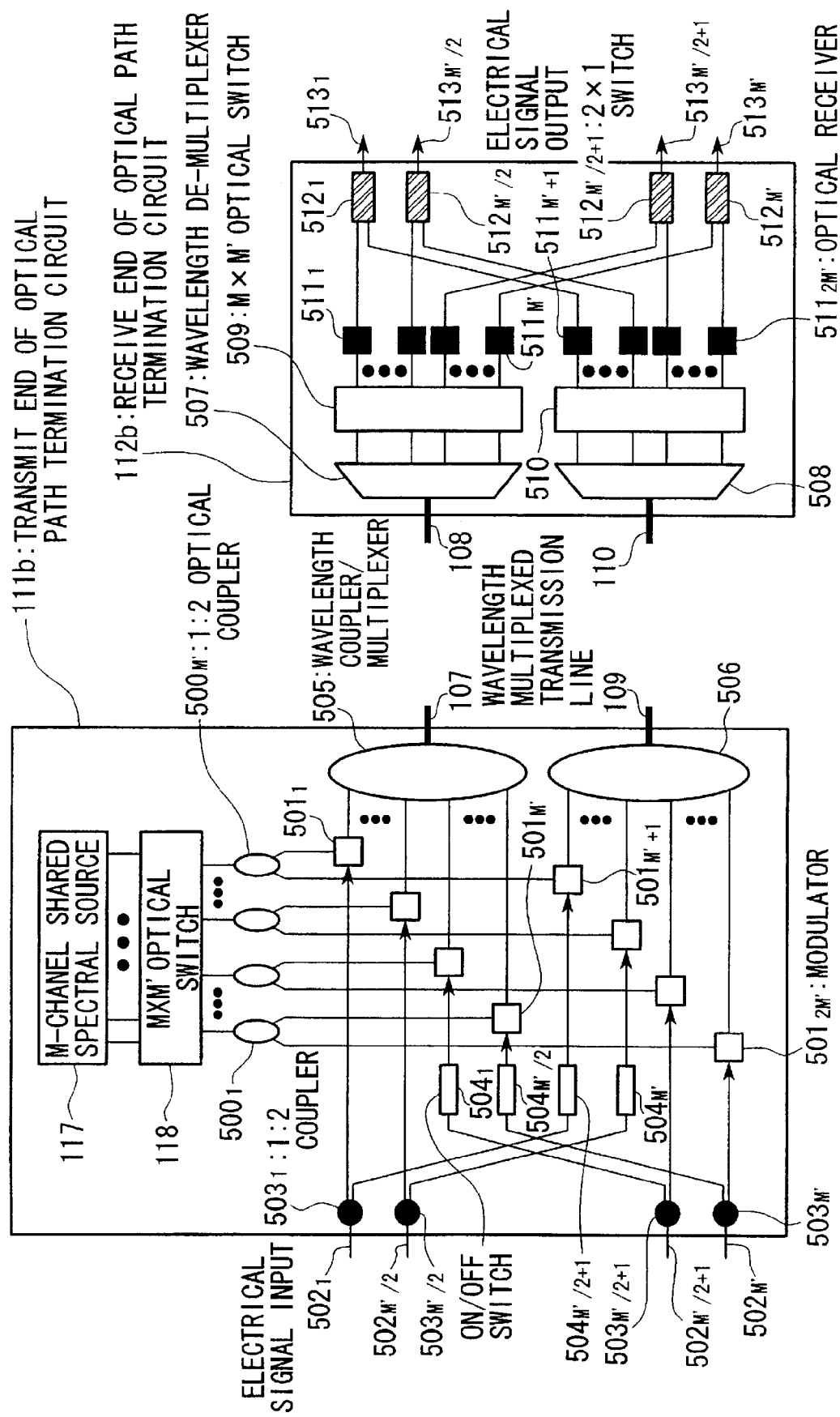
FIG. 7 is a schematic diagram of the transmit end and the receive end of the op termination circuit in the network in Embodiment 4.
Figure 8:
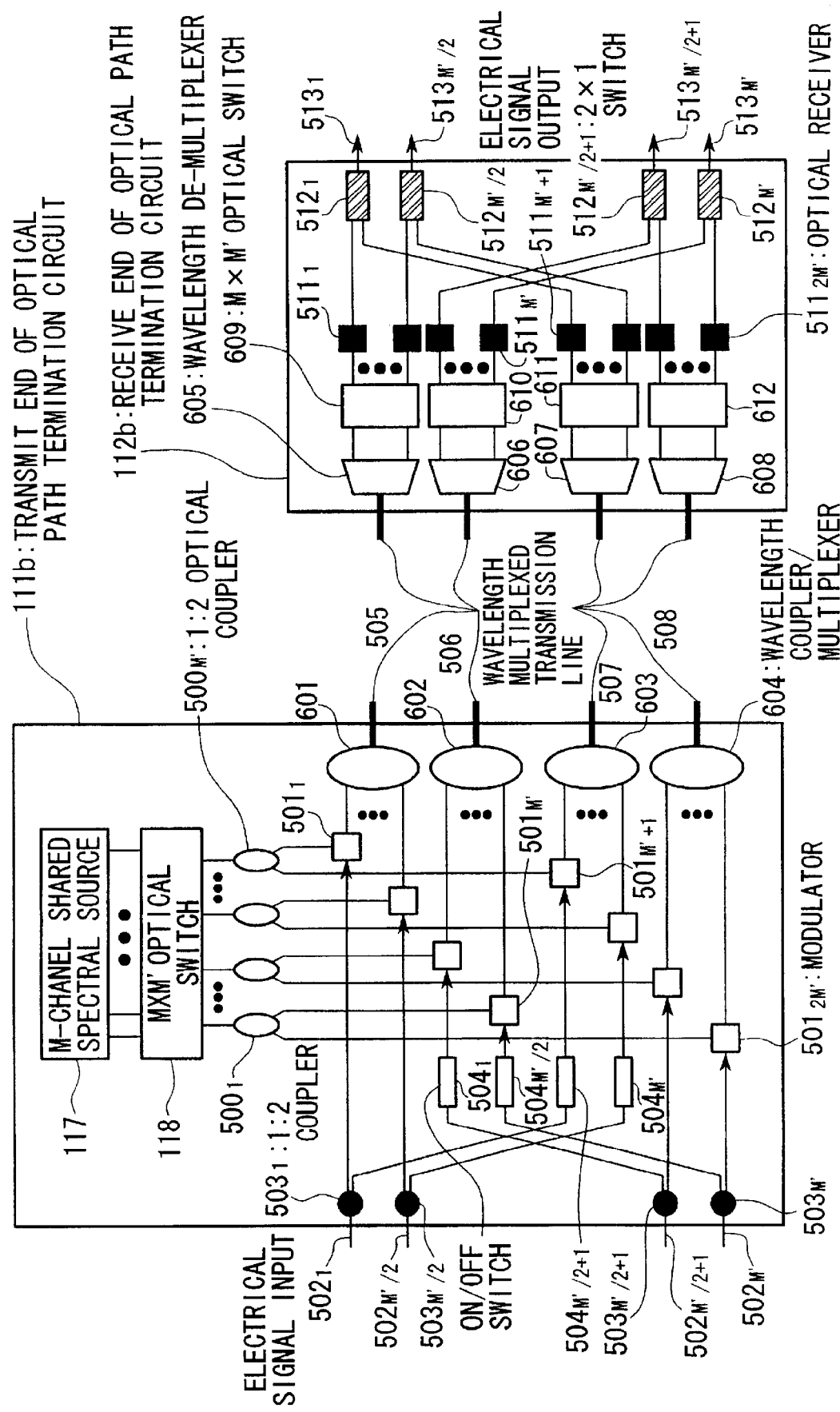
FIG. 8 is a schematic diagram of a modification of the transmit end and the receive end of the op termination circuit in the network in Embodiment 4.

FIG. 7 is a schematic diagram of the configuration of the transmit and receive ends in the optical path (op) termination circuit in the WDM ring network in Embodiment 4, and FIG. 8 is a schematic diagram of a modification of the basic configuration, in which the nodes are connected by either 2 or 4 fibers to correspond with the ring network disclosed in claim 6.

The transmit end 111$b$ shown in FIG. 7 is a case of duplicating the optical paths for at least N−1 channels selected at each node of 2F-BR architecture as explained in FIG. 1.

The transmit end 111$b$ is comprised by: a shared light source 117 and M×M' switches 118 (M≧M'≧N−1) as the wavelength source; 1:2 optical couplers $500_1$~$500_{M'}$ for duplicating the selected wavelengths; modulators $501_1$~$501_{2M'}$ for superimposing electrical signals to respective waves; 1:2 electrical splitters $503_1$~$503_{M'}$ for duplicating respective electrical signals from electrical input $502_1$~$502_{M'}$; on/off switches $50_4$~$50_{4M'}$ for gating one of respective electrical signals, and optical couplers 505, 506 for multiplexing wavelengths inserted in the OADM 101, 102 (refer to FIG. 3). The optical couplers 505, 506 are connected to respective WDM transmission lines 107, 109 for transmitting optical signals containing wavelengths to be inserted.

The receive end 112$b$ of the op termination circuit is comprised by: wavelength de-multiplexers 507, 508 connected to the WDM transmission lines 108, 109 for transmitting optical signals containing waves processed by the OADM 101, 102 and de-multiplexing the branched waves; M×M' optical switches 509, 510 for directing de-multiplexed waves to desired paths; photo-electric converters $511_1$~$511_{2M'}$ for converting received optical signals to electrical signals; and 2×1 switches $512_1$~$512_{M'}$ for selecting one electrical signal from the two electrical signals received. Here, electrical signal input $502_1$~$502_{M'}$ matches with the respective electrical signal output $513_1$~$513_{M'}$, and their relationship relates to the two bi-directional optical paths (lines) working between the nodes.

A modification shown in FIG. 8 is a transmit end of the op termination circuit of this embodiment, and is an example of a 4F-Br architecture based on the configuration shown in Embodiment 1, and doubles the N−1 waves selected in each node.

The transmit end 111$c$ is comprised by: a shared light source 117 and M×M' switches 118 as the wavelength source; 1:2 optical couplers $500_1$~$500_{M'}$ for duplicating the selected wavelengths; modulators $501_1$~$501_{2M'}$ for superimposing electrical signals to respective waves; 1:2 electrical couplers $503_1$~$503_{M'}$ for duplicating respective electrical signals from electrical input $502_1$~$502_{M'}$; on/off switches $504_1$~$504_{M'}$ for gating the respective electrical signals; and optical couplers 601~604 for multiplexing wavelengths inserted in the OADM (refer to 101, 102 in FIG. 3). The optical couplers 601~604 are connected to respective WDM transmission lines 505, 508 (correspond to WDM transmission lines 107, 109) for transmitting optical signals containing waves to be inserted.

The receive end 111$c$ of the op termination circuit is comprised by: wavelength de-multiplexers 605~608 for de-multiplexing branched waves from WDM transmission lines (refer to WDM lines 108, 109 in FIG. 3) for transmitting optical signals containing waves processed by the OADM (refer to OADM 101, 102 in FIG. 3); M×M' optical switches 609~612 for directing de-multiplexed waves to desired paths; photo-electric converters $511_1$~$511_{2M'}$ for converting received optical signals to electrical signals; and 2×1 switches $512_1$~$512_{M'}$ selecting one electrical signal from the two electrical signals received. Here, electrical signal input $502_1$~$502_{M'}$ matches with the respective electrical signal output $513_1$~$513_{M'}$, and their relationship relates to the two bi-directional optical paths (lines) working between the nodes.

The features of the transmit and receive ends of the op termination circuit are that, when a fault is developed inside a ring network and an optical path containing a certain wavelength is disrupted, the receive end of the op termination circuit turns on the on/off switch so as to superimpose electrical signals branched by the 1:2 couplers $503_1$~$503_{M'}$ on the optical signals of the same wavelengths as those before the failure, and the signals are transmitted in a reverse direction to the normal optical path, thereby providing a method based on the optical path protection.

In this case, the optical path that has failed is switched at the start and end nodes surrounding the fault. Therefore, this method of circuit protection is different from the district-based switching used in the conventional methods.

Here, the reverse direction path for emergency use is serving the function of a protection path for use in emergency operations.

In other words, in FIGS. 7 and 8, when an optical path is provided to transmit optical signals, produced by superimposing information due to electrical signal input $502_1$ and modulated by the modulator $501_1$, from node 1 to node 2, the optical path from the node 2 to one node 1 is de-multiplexed by the wavelength de-multiplexer 507 (605) in the receive section 112$b$ of the op termination circuit, and is directed by the M×M' switch 509 (609) to be input in the p-e converter $511_1$, converted to electrical signals in the p-e converter $511_1$, and becomes electrical signal output $513_1$ through the 2×1 switch $512_1$.

On the other hand, when a fault is developed in the optical path superimposed with information due to electrical signal input $502_1$, the duplicated signals are modulated in the modulator $501_{M'+1}$ by turning on the on/off switch $504_{M'/2+1}$, thereby enabling to continue operating the network.

In the meantime, to continue to communicate with node 1, the receive end 112$b$ (112$c$) of the op termination circuit utilizes the new line that has been provided as a protection circuit, to convert optical signals in the p-e converter $511_{M'+1}$, to select waves in the 2×1 switch $512_1$ and to output to electrical signal output $513_1$.

Another feature of the embodiment is that, by having a path protection for each wavelength, faults inside the node (problems in OADM and modulators) can be avoided to enable to continue operating the ring network.

That is, when the optical path superimposed with information of electrical signals $502_1$ fails inside the node 1, for example a failure in the modulator $501_1$ or optical coupler 505, the duplicated electrical signals are modulated in the modulator $501_{M'+1}$ by turning on the on/off switch $504_{M'/2+1}$ to continue to operate the ring network.

In the meantime, the receive end of the op termination circuit, to continue to operate the network, after receiving the new optical path in the photo-electric converter $511_{M'+1}$ and converting to electrical signals, electrical signals selected by the 2×1 switch $512_1$ are output to electrical signal output $513_1$.

To execute the above steps, in the 2F network shown in FIG. 7, two fibers between the nodes are each superimposed with a half of the emergency-use waves, so that the normal-use waves used in the clockwise fibers are used only as emergency-use waves in the counter-clockwise fibers. The emergency-use waves used in the clockwise fiber are used only as normal-use waves in the counter-clockwise fibers. Also, in the optical paths provided in node 2, waves allocated to clockwise optical paths are different in wavelength from those waves allocated to counter-clockwise optical paths, and respective protection paths are allocated with normal-use waves of the opposite optical paths.

Also, in the case of the 4F-BR network shown in FIG. 8, two optical fibers for each clockwise and counter-clockwise direction are provided, and each includes normal-use fibers and emergency-use fibers.

Embodiment 5

Figure 9:
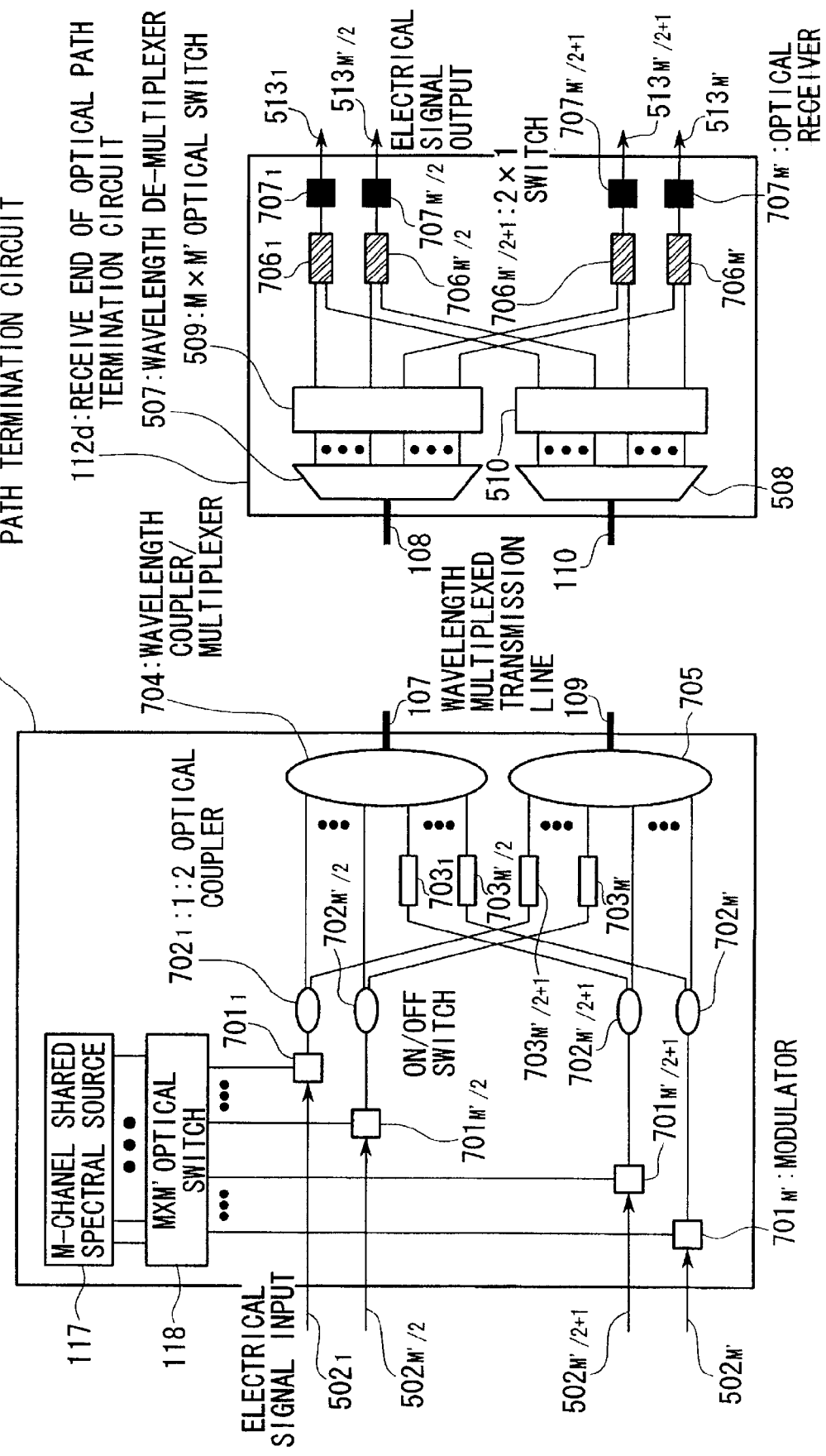
FIG. 9 is a schematic diagram of the transmit end and the receive end of the op termination circuit in the network in Embodiment 5.

FIG. 9 is a schematic diagram of the transmit end and receive end of WDM ring network of the 2F-BR architecture in Embodiment 5, and is an example of the transmit end of the optical path (op) termination circuit disclosed in claim 8.

This transmit end 111d of the op termination circuit is based on the 2F-BR ring network presented in Embodiment 1, and provides duplication of at least N−1 waves selected at each node.

The transmit end 111d is comprised by: an M-channel shared light source 117 as the wavelength source; an M×M' switch 118; modulators $701_1$~$701_{M'}$ for superimposing electrical signals to respective waves; 1:2 optical couplers $702_1$~$702_{M'}$ for duplicating the optical signals superimposed with electrical signals; 1:2 optical couplers $702_1$~$702_{M'}$ for duplicating optical signals superimposed with electrical signals; on/off switches $703_1$~$703_{M'}$ for gating respective optical signals; and optical couplers 704, 705 for multiplexing wavelengths inserted in the OADM 101, 102. The optical couplers 704, 705 are connected to respective WDM transmission lines 107, 109 for transmitting optical signals containing wavelengths to be inserted.

The receive end 112d of the op termination circuit is comprised by: wavelength de-multiplexers 507, 508 for de-multiplexing waves input from WDM transmission circuits 108, 110 for transmitting optical signals containing wavelengths processed in the OADM 101, 102; wavelength de-multiplexers 507, 508 for de-multiplexing branched waves from WDM transmission lines for transmitting optical signals containing waves from the OADM; M×M' optical switches 509, 510 for directing de-multiplexed waves to desired paths; 2×1 optical switches $706_1$~$706_{M'}$ for selecting one group of optical signals input from each of the two different M×M' optical switches 509, 510; photo-electric converters $707_1$~$706_{M'}$ for converting received optical signals to electrical signals. Here, electrical signal input $502_1$~$502_{M'}$ matches with the respective electrical signal output $513_1$~$513_{M'}$, and their relationship relates to the two bi-directional optical paths (lines) working between the nodes.

Here, the feature of the transmit and receive ends of the op termination circuit is that, as in Embodiment 4, when a fault is developed within the ring network or inside a node containing a certain wavelength is disrupted, the receive end of the op termination circuit turns on the on/off switch so as to insert a new optical path created by optical signal duplicated by the 1:2 coupler in OADM connected to the fiber in the reverse direction of the optical path of normal-use waves that are used before the failure. Additionally, the protection path is created at the optical signal level so that switching is carried out by optical switches.

As in Embodiment 4, the optical protection path provided between two nodes are switched between the start and end nodes of the faulty optical path.

In other words, in FIG. 9, when an optical path superimposed with information due to electrical signal input $502_1$ and modulated by the modulator $701_1$ is provided to transmit optical signals from node 1 to node 2, the optical path from the node 2 to one node 1 is de-multiplexed by the wavelength de-multiplexer 507 in the receive section 112d of the op termination circuit, and is directed by the M×M' switch 509 to be input in the 2×1 optical switch $706_1$, converted to electrical signals in the p-e converter $707_1$, and becomes electrical signal output $513_1$.

On the other hand, when a fault is developed in an optical path superimposed with information due to electrical signal input $502_1$ within the ring network or inside the node, the network is continued to be operated by turning on the on/off switch $703_{M'/2+1}$ to couple to the optical signal duplicated in the 1:2 optical coupler $702_1$ in the optical coupler 705. In the meantime, in the receive section 112d of the op termination circuit, the optical path newly created as a protection path to continue operating to node 1 is de-multiplexed by the wavelength de-multiplexer 508 in the receive section 112d of the op termination circuit, and is directed by the M×M' switch 510 to be input in the 2×1 optical switch $706_1$, converted to electrical signals in the p-e converter $707_1$, and becomes electrical signal output $513_1$.

Further, similar to Embodiment 3, the present embodiment is applicable also to the 4F-BR network. In such a case, each wavelength multiplexer and optical coupler shown in FIG. 9 is divided into two, so that they can process at least (N−1)/2 waves, which are multiplexed to produce optical signals that are transmitted between the OADM and the op termination circuit to provide a WDM ring network.

Accordingly, by using the WDM ring network of the present embodiment, it is possible to operate the network based on the method of path protection so that problems inside the node can be treated and the transmission distance can be reduced.

Embodiment 6

Figure 10:
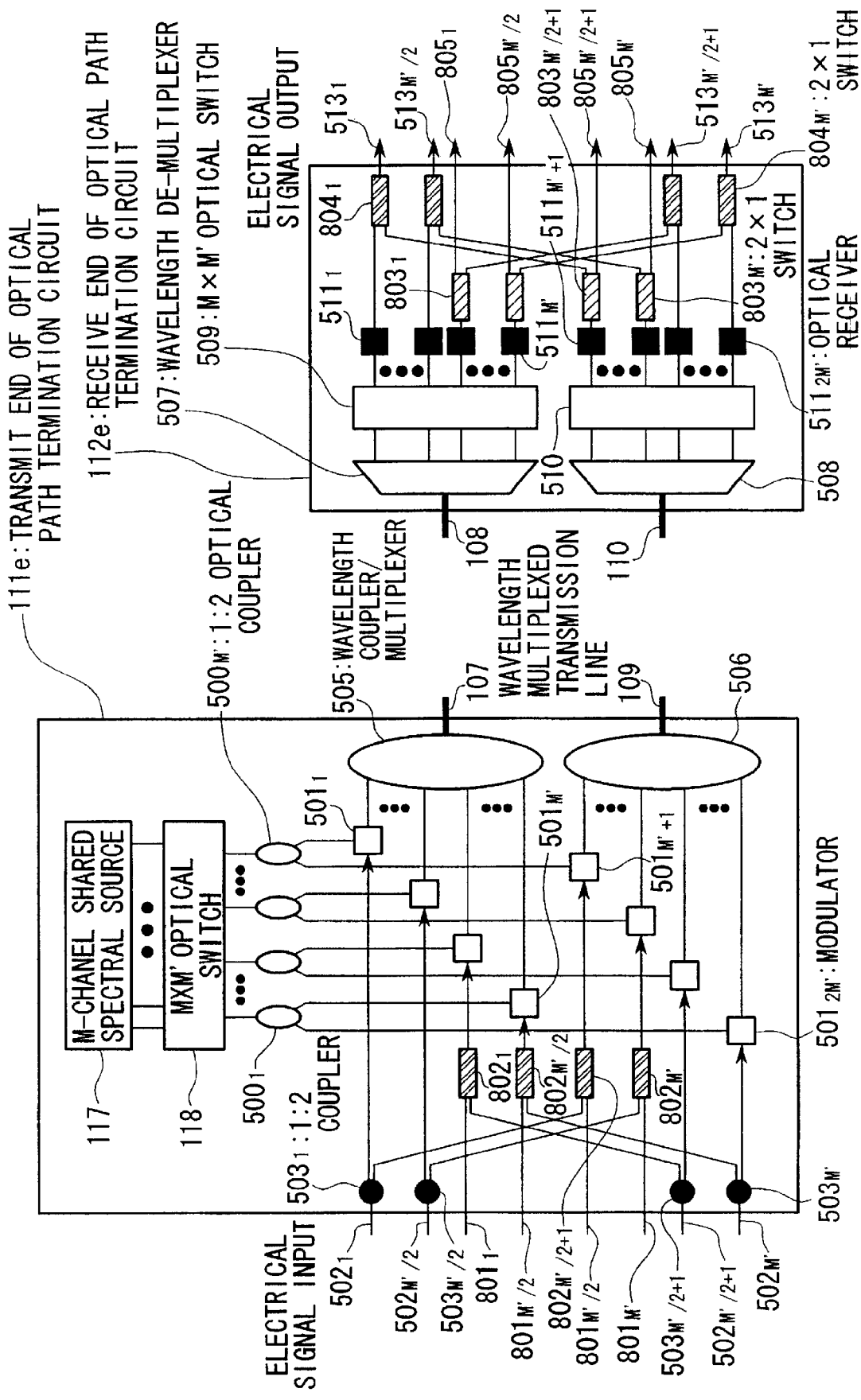
FIG. 10 is a schematic diagram of the transmit end and the receive end of the op termination circuit in the network in Embodiment 6.
Figure 11:
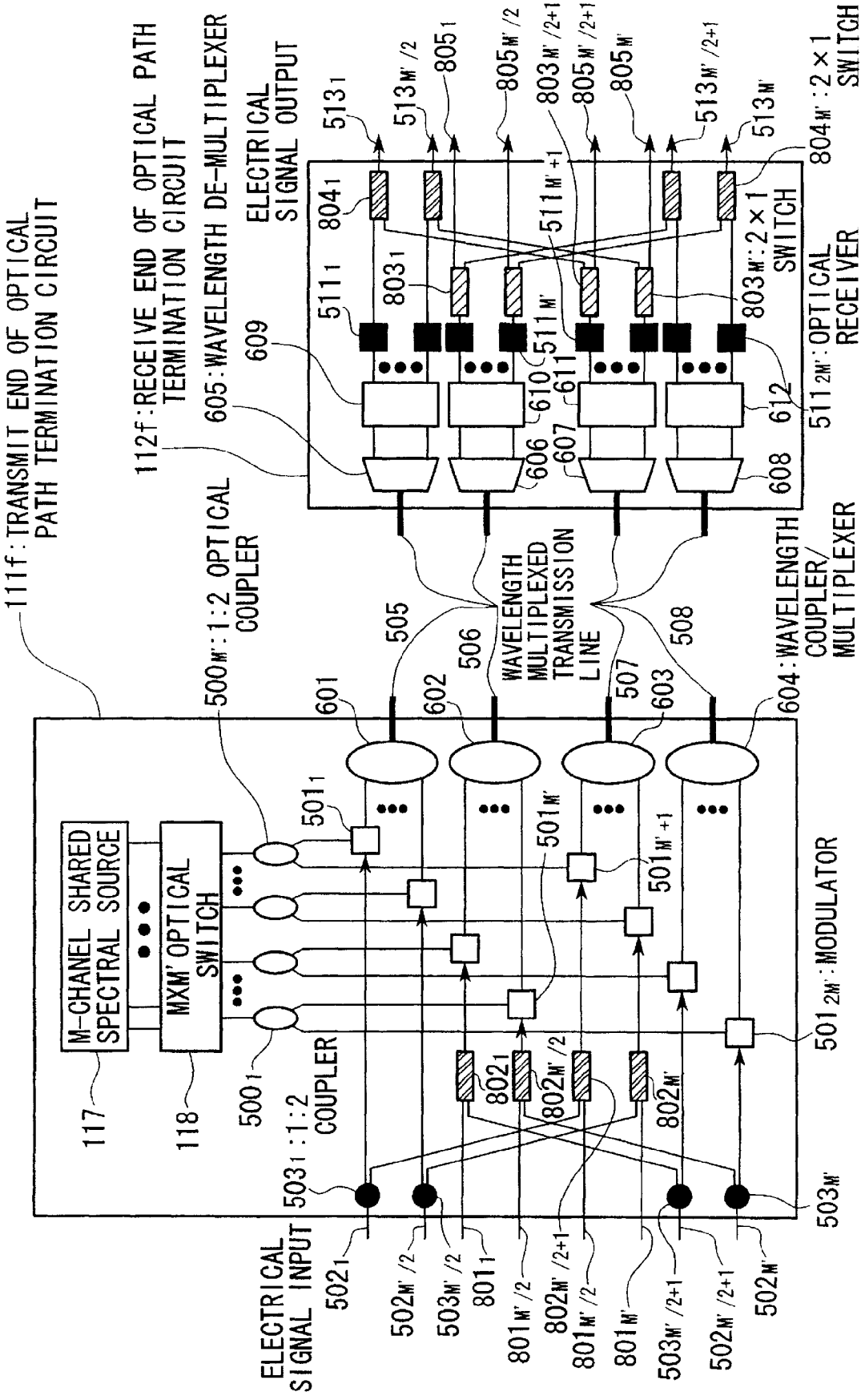
FIG. 11 is a schematic diagram of a modification of the transmit end and the receive end of the op termination circuit in the network in Embodiment 6.

FIG. 10 is a schematic diagram of the transmit end and receive end of WDM ring network of the 2F-BR architecture in Embodiment 6, FIG. 11 shows a modification of the transmit and received ends in the 2F- or 4F-BR network, and is an example of the transmit end of the op termination circuit disclosed in claim 7 or 9.

The transmit end 111e shown in FIG. 10 is based on the 2F-BR ring network of Embodiment 1, and optical paths of at least (N−1) waves selected by each node are duplicated, and one optical path in each group is superimposed with information that is different from the information in other optical path. The different information line is termed extra-traffic.

The transmit end 111e is comprised by: an M-channel shared light source 117 as the wavelength source; an M×M' switch 118; 1:2 optical couplers $500_1$~$500_{M'}$ for duplicating the selected wavelengths; normal electrical signal input $502_1$~$502_{M'}$ for normal information to be delivered; modulators $501_1$~$501_{M'}$ for superimposing electrical signals to respective waves; 1:2 electrical couplers $503_1$~$503_{M'}$ for duplicating electrical signals for normal information; extra-traffic electrical signal input $801_1$~$801_{M'}$ for extra-traffic information; 2×1 switches $802_1$~$802_{M'}$ for selecting either the normal electrical signals or extra-traffic electrical signals; and optical couplers 505, 506 for multiplexing wavelengths to be inserted in the OADM. The optical couplers 505, 506 are connected to respective WDM transmission lines 107, 109 for transmitting optical signals including wavelengths to be inserted.

The receive end 112e of the optical path (op) termination circuit is comprised by: wavelength de-multiplexers 507, 508 for de-multiplexing waves transmitted through WDM transmission lines 108, 110 for transmitting optical signals containing waves branched from the OADM; M×M' optical switches 509, 510 for directing de-multiplexed waves to desired paths; photo-electric converters $511_1$~$511_{2M'}$ for converting received optical signals to electrical signals; 1×2 switches $803_1$~$803_{M'}$ for outputting normal information to electrical signal output $513_1$~$513_{M'}$ and extra-traffic information to electrical signal output $805_1$~$805_{M'}$; and 2×1 switches $804_1$~$804_{M'}$ for selecting one electrical signal from the two electrical signals received. Here, electrical signal input $502_1$~$502_{M'}$ matches with the respective electrical signal output $503_1$~$503_{M'}$, and electrical signal input $801_1$~$801_{M'}$ matches with the respective electrical signal output $805_1$~$805_{M'}$, and their relationship relates to the two bi-directional optical paths (lines) working between the nodes.

FIG. 11 shows a modification of the above system, and the transmit end 111f is based on the node configuration shown in Embodiment 1 in the 4F-BR architecture, and duplicates at least N–1 waves selected at each node, so that extra-traffic information is superimposed by extra-traffic electrical signals on each of the optical paths, which are offered for use as normal operation.

The transmit end 111f is comprised by: an M-channel shared light source 117 as the wavelength source; an M×M' switch 118; 1:2 optical couplers $500_1$~$500_{M'}$ for duplicating the selected wavelengths; normal electrical signal input $502_1$~$502_{M'}$ for normal information; modulators $501_1$~$501_{2M'}$ for superimposing electrical signals on respective waves; 1:2 electrical couplers $503_1$~$503_{M'}$ for duplicating normal information; extra electrical signal input $801_1$~$801_{M'}$ for extra-traffic information; 2×1 switches $802_1$~$802_{M'}$ for selecting either the normal electrical signals or extra-traffic electrical signals; optical couplers 601, 604 for multiplexing waves in optical paths for the normal information; and optical couplers 602, 603 for multiplexing waves in optical paths for either the normal information or the extra-traffic information. The optical couplers 601~604 are connected to respective WDM transmission lines 505~508 for transmission of optical signals superimposed with these waves (correspond to WDM lines 107, 109 in FIG. 3).

The receive end 112f of the op termination circuit is comprised by: normal wave de-multiplexers 605, 608 for multiplexing only the waves in optical path for normal information; de-multiplexers 606, 607 for multiplexing either the waves in optical path for normal information or the waves in optical path for extra-traffic information; M×M' optical switches 609~612 for directing de-multiplexed waves to desired paths; photo-electric converters $511_1$~$511_{2M'}$ for converting received optical signals to electrical signals; 1×2 switches $803_1$~$803_{M'}$ outputting normal information to electrical signal output $513_1$~$513_{M'}$ and extra-traffic information to electrical signal output $805_1$~$805_{M'}$; and 2×1 switches $804_1$~$804_{M'}$ for selecting one electrical signal from the two electrical signals received. Here, electrical signal input $502_1$~$502_{M'}$ matches with the respective electrical signal output $513_1$~$513_{M'}$, and electrical signal input $801_1$~$801_{M'}$ matches with the respective electrical signal output $805_1$~$805_{M'}$, and their relationship relates to the two bi-directional optical paths (lines) working between the nodes.

The feature of the transmit end and the receive end in this embodiment is that, when the network is operating normally, the number of optical paths for normal information to service a full mesh configuration are provided as well as multiple extra-traffic optical paths so that when a fault is developed in the network, multiple optical paths for extra-traffic information are not offered so as to continue to operate the optical paths for normal information. In other words, this network is equivalent to Embodiment 4 or 5 when the protection paths are released during the normal operation so as to service extra-traffic.

That is, in the 2F-BR network shown in FIG. 10, when the normal information optical paths are to be used, electrical signal input $502_1$ for information is superimposed on the wave by the modulator $501_1$ in the transmit end 111e, which is multiplexed with other waves in the optical coupler 505 to provide transmission from node 1 to node 2. The optical path for node 2 to node 1 is de-multiplexed by the wavelength de-multiplexer 507 in the receive end 112e, and is directed by the M×M' switch 509 to be input in the p-e converter $511_1$. Converted electrical signals are output to electrical signal output $513_1$ through the 2×1 switch $804_1$.

Concurrently, in the receive end 111e, extra-traffic information on the electrical signal input $801_{M'/2+1}$ is input in the modulator $502_{M'+1}$ through the 2×1 switch $802_{M'/2}$ to superimpose extra-traffic information, multiplexed in the optical coupler 506 with other waves, thereby establishing operation through a new optical path between the nodes. Also, in the receive end 112e, optical path of extra-traffic information from node 2 to node 1 is de-multiplexed by the wavelength de-multiplexer 508, directed by the M×M' switch 510 to output to the p-e converter $511_{M'+1}$ and is converted to electrical signals in the p-e converter $511_{M'+1}$, and becomes electrical signal output $805_{M'/2+1}$ through the 1×2 switch $803_{M'/2+1}$.

On the other hand, when a fault is developed in the optical path superimposed with information carried by electrical signal input $502_1$, at least the extra-traffic service offered by electrical signal input $801_{M'/2+1}$ and extra-traffic service output to electrical signal output $801_{M'/2+1}$ are stopped, and in the transmit end 111e of the op termination circuit, branched electrical signal input $502_1$ is selected by the 2×1 switch $802_{M'/2+1}$, and in the receive end 112e, normal electrical signals for the normal information input by the 1×2 switch $803_{M'/2+1}$ are branched so as to output to electrical signal output $513_1$, which is selected by the 2×1 switch $804_1$ so as to enable output to electrical signal output $513_1$.

That is, in the 4F-BR network shown in FIG. 11, when the normal information optical paths are to be used, electrical signal input $502_1$ for information is superimposed on the wave by the modulator $501_1$ in the transmit end 111f, which is multiplexed in the optical coupler 505 with the waves for normal information to provide transmission from node 1 to node 2. The optical path for node 2 to node 1 is de-multiplexed by the wavelength de-multiplexer 605 in the receive end 112f, and is directed by the M×M' switch 609 to be input in the p-e converter 511I for conversion to electrical signal. Converted electrical signals are output to electrical signal output $513_1$ through the 2×1 switch $804_1$.

Concurrently, in the receive end 111f, extra-traffic information due to the electrical signal input $801_{M'/2+1}$ is input in the modulator $502_{M'+1}$ through the 2×1 switch $802_{M'/2+1}$ to superimpose extra-traffic information, multiplexed in the optical coupler 603 with other waves, thereby establishing operation through a new optical path between the nodes. Also, in the receive end 112f, optical path of extra-traffic information from node 2 to node 1 is de-multiplexed by the wavelength de-multiplexer 607, directed by the M×M' switch 611 to output to the p-e converter $511_{M'+1}$, and is converted to electrical signals in the p-e converter $511_{M'+1}$, and becomes electrical signal output $805_{M'/2+1}$ through the 1×2 switch $803_{M'/2+1}$.

When a fault is developed in the optical path superimposed with information carried by electrical signal input $502_1$, at least the extra-traffic service offered by electrical signal input $801_{M'/2+1}$ and the extra-traffic service output to electrical signal output $801_{M'/2+1}$ are stopped. In the transmit end 111f of the op termination circuit, branched electrical signal input $502_1$ is selected by 2×1 switch $802_{M'/2+1}$, and in the receive end 112f, normal electrical signals for the normal information input by the 1×2 switch $803_{M'/2+1}$ is branched so as to output to electrical signal output $513_1$, which is selected by the 2×1 switch $804_1$ and become electrical signal output $513_1$.

Accordingly, the use of the present system of ring network enables to provide two kinds of services: one in which the service can be maintained even when there are problems within the network; and one in which the service is terminated when there are problems within the network.

Embodiment 7

Figure 12:
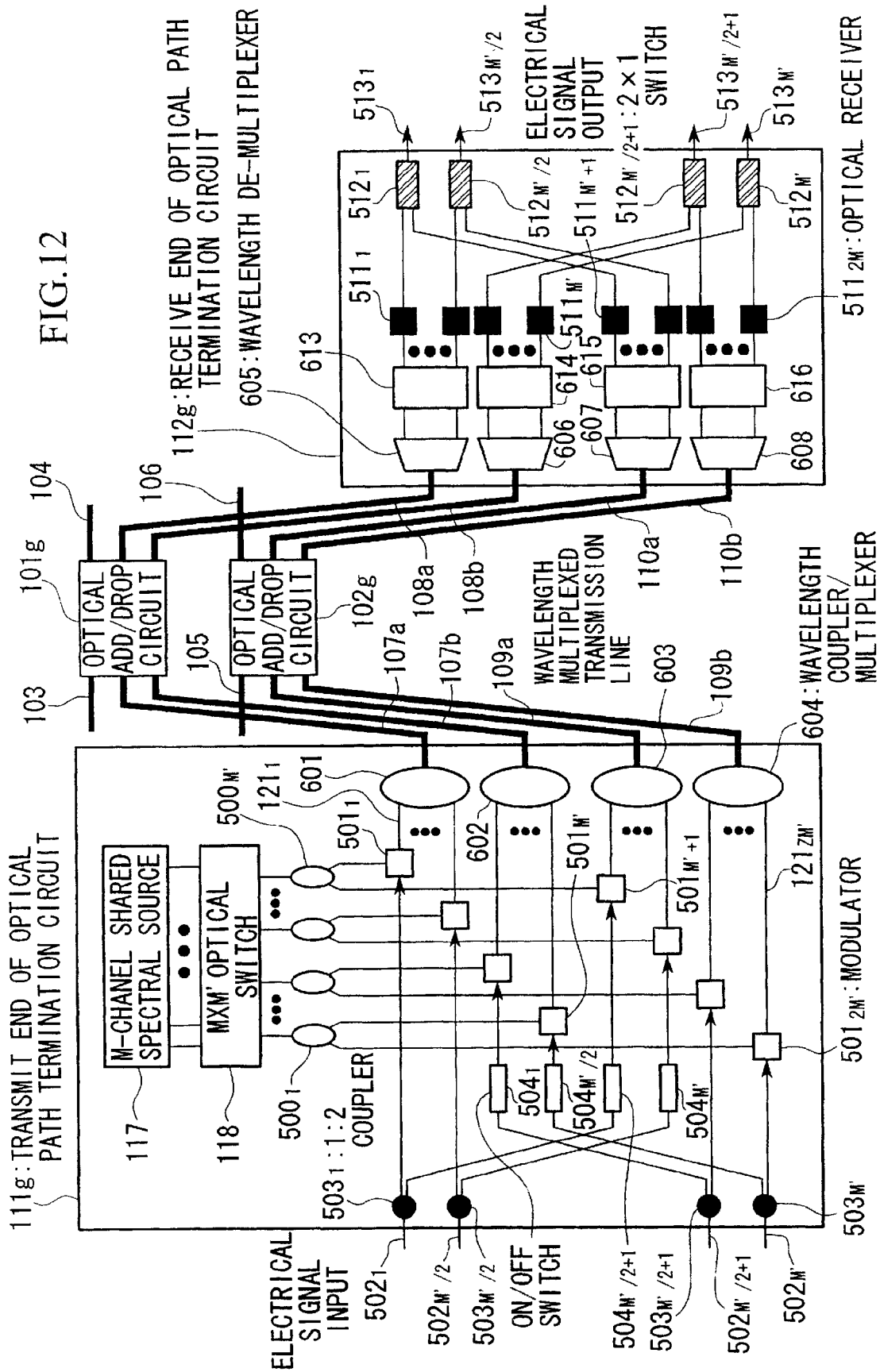
FIG. 12 is a schematic diagram of the WDM ring network in Embodiment 7.

FIG. 12 shows another embodiment of the 2F-BR ring network according to the configuration disclosed in claim 12.

This network is derived from the fourth embodiment of the present invention shown in FIG. 7. In this network, conventional op termination circuit is modified so that certain multiplexed waves can be processed in such a way that particular waves are separated into a wave group that is used for the normal operation and other group containing all other waves.

This network is comprised by: OADMs 101g, 102g, optical fibers 103~106 provided between two adjacent nodes; transmit end 111g and receive end 112g of the optical path (op) termination circuit; and optical fibers 107a, 107b, 108a, 108b, 109a, 109b, 110a, 110b to connect the OADM 101g, 102g with respective transmit and receive ends 111g, 112g of the op termination circuits.

In the OADM 101g, optical signals are transmitted from adjacent node through the optical fiber 103, and only the optical signals produced by multiplexing the normal-use waves are transmitted to the wavelength de-multiplexer 605 in the receive end 112g through the transmission line 108a, and only the optical signals produced by multiplexing the emergency-use waves are transmitted to the wavelength de-multiplexer 606 through the optical fiber 108b. In this case, of the waves selected by the transmit end 111g, only the normal-use waves are inserted in OADM 101g by the optical coupler 601 through the optical fiber 107a, and only the emergency-use waves are inserted in OADM 101g using the optical coupler 602 through the optical fiber 107b.

The optical signals inserted in OADM 101g are multiplexed with other waves that were not processed in the node, and are transmitted to other adjacent node through the optical fiber 104.

In the OADM 102g, optical signals are transmitted from adjacent node through the optical fiber 105, and the branched optical signals are transmitted to the wavelength de-multiplexers 607, 608 in the received end 112g using the optical fibers 109a, 109b, and concurrently, waves selected by the transmit end 111g are multiplexed with waves transmitted through optical fibers 109a, 109b, and the multiplexed waves are transmitted to other adjacent node different than the above node using the optical fiber 106.

The waves that are processed at this time are separated, as in the previous OADM 101g, into normal-use wave group and emergency-use wave group. Emergency-use waves are sent through WDM lines 109a, 110a while normal-use waves are sent through WDM lines 109b, 110b. The WDM line 103, 105 relate to optical input signals send from different adjacent nodes.

Next, the operation and the structure of the op termination circuits 111g, 112g will be explained.

The transmit end 111g of the op termination circuit is comprised by: an M-channel shared light source 117; an M×M' optical switch 118 (M≧M'≧N−1); M×M modulators $501_1$~$501_{2M'}$ for superimposing information due to electrical signals on respective waves; optical signal transmission lines $121_1$~$121_{2M'}$ for transmitting waves superimposed with respective information; and optical couplers 601, 602, 603, 604 for multiplexing transmitted waves.

The receive end 112g is comprised by: wavelength de-multiplexers 605, 608, for de-multiplexing optical signals carrying multiplexed normal-use waves only, and de-multiplexers 606, 607, for de-multiplexing optical signals carrying multiplexed emergency-use waves only, (M/2)×(M'/2) switches 613, 614, 615, 616 (M≧M'≧N−1); photo-electric converters $511_1$~$511_{2M'}$ for converting the waves output from the (M/2)×(M'/2) switches 613, 614, 615, 616; optical signal transmission lines for transmitting signals between the switches 613, 614, 615, 616 and the photo-electric converters $511_1$~$511_{2M'}$; 2×1 optical switches $512_1$~$512_{M'}$; and electrical signal output $513_1$~$513_{2M'}$ for outputting electrical signals converted by the photo-electric converters $511_1$~$511_{2M'}$.

Next, the feature of the network, that the waves are separated into normal-use waves and emergency-use waves and processed accordingly in the OADM, will be explained using an example in which N=15.

For example, the necessary number of waves M for connecting the nodes in a full mesh configuration in the 2F-BR architecture is given by M=(N²−1)/4, and when N=15, M is 56. In each node, in order to communicate with other fourteen nodes, it is necessary to process fourteen waves and the same number of waves must be processed for emergency use, In other words, in FIG. 12, of the fifty-six waves input by the WDM lines 103, 105, fourteen waves of equal wavelengths are processed by the OADM 101g, 102g, and are forwarded to the op termination circuits 111g, 112g.

In the transmit end 111g of the op termination circuit, fourteen waves having the same wavelengths as the processed fourteen waves are duplicated by the 1:2 coupler, and each of the duplicated waves are used as normal-use waves and emergency-use waves, and seven normal-use waves are input in the wavelength de-multiplexer 601, and seven emergency-use waves having different wavelengths from the above seven waves are input in the wavelength de-multiplexer 602. Therefore, a total of fourteen wavelengths are input in the OADM 101g.

On the other hand, fourteen waves inserted in the OADM 102g are similarly comprised by seven waves for normal use and seven waves for emergency use. Of the fourteen waves input in the OADM 101g, the seven normal-use waves have the same wavelengths as the seven emergency-use waves, and of the fourteen waves input in the OADM 101g, the seven emergency-use waves have the same wavelengths as the seven normal-use waves.

As demonstrated in this embodiment, because the waves are separated into normal-use waves and emergency-use waves, the optical couplers in the transmit end 111g or de-multiplexers in the receive end 112g in the op termination circuit only needs to process seven waves, so that, compared with the conventional network in which the normal-use waves are not distinguished from the emergency-use waves, the scale of the optical couplers and de-multiplexers can be halved.

Accordingly, the WDM network of this embodiment enables to separate the waves for use only in normal operation and the waves for use only in emergency operation so that the scale of the wave couplers and de-multiplexers can be reduced. The result is that optical parts can be made more compact and easier to manufacture, and the system cost will be reduced, further benefit is that the problems in components in the emergency-use circuits do not affect the normal operation of the network.

In this embodiment, when the system is operating normally, emergency-use waves are imposed with information different from normal information to offer a service different from the normal service. In this embodiment, the extra-traffic service recited in claim 14 is not executed, but this can be included by arranging the network in the following manner. Replace the on/off switches $504_1$~$504_{M'}$ in the transmit end 111g in FIG. 12 with 2×1 switches for inputting extra-traffic electrical signals, and insert 1×2 switches in the back stage of the (M/2)×(M'/2) switches 614, 615 (used only for emergency-use waves) in the receive end 112g, so that one signal from the 1×2 switch is input in the 2×1 switch and other signal from the 1×2 switch is output as extra-traffic service.

Also, in the configuration shown in FIG. 12, the op termination circuit includes four optical couplers and four wavelength de-multiplexers, but if the system is organized in such a ways that normal-use waves and emergency-use waves can be input separately, these components can be separated to be used for the normal-use waves and emergency-use waves so that there is no need to limit to the configuration shown.

Further, switching of optical paths does not necessarily be performed at the electrical level using on/off switches $504_1$~$504_{M'}$, instead, switching can be performed on the optical level using optical switches.

Further in the present embodiment, the emergency operation was based on an optical path protection approach based on switching of faulty optical path, but it is possible to carry out an emergency operation based on switching M-channels. In such a case, optical fibers 103, 105 are input in the OADM 101g, 102g through the 2×2 switch, and optical fibers (fibers) 104, 106 are connected to the 2×2 optical switch through the 2×2 optical switch in the adjacent node.

Embodiment 8

Figure 13:
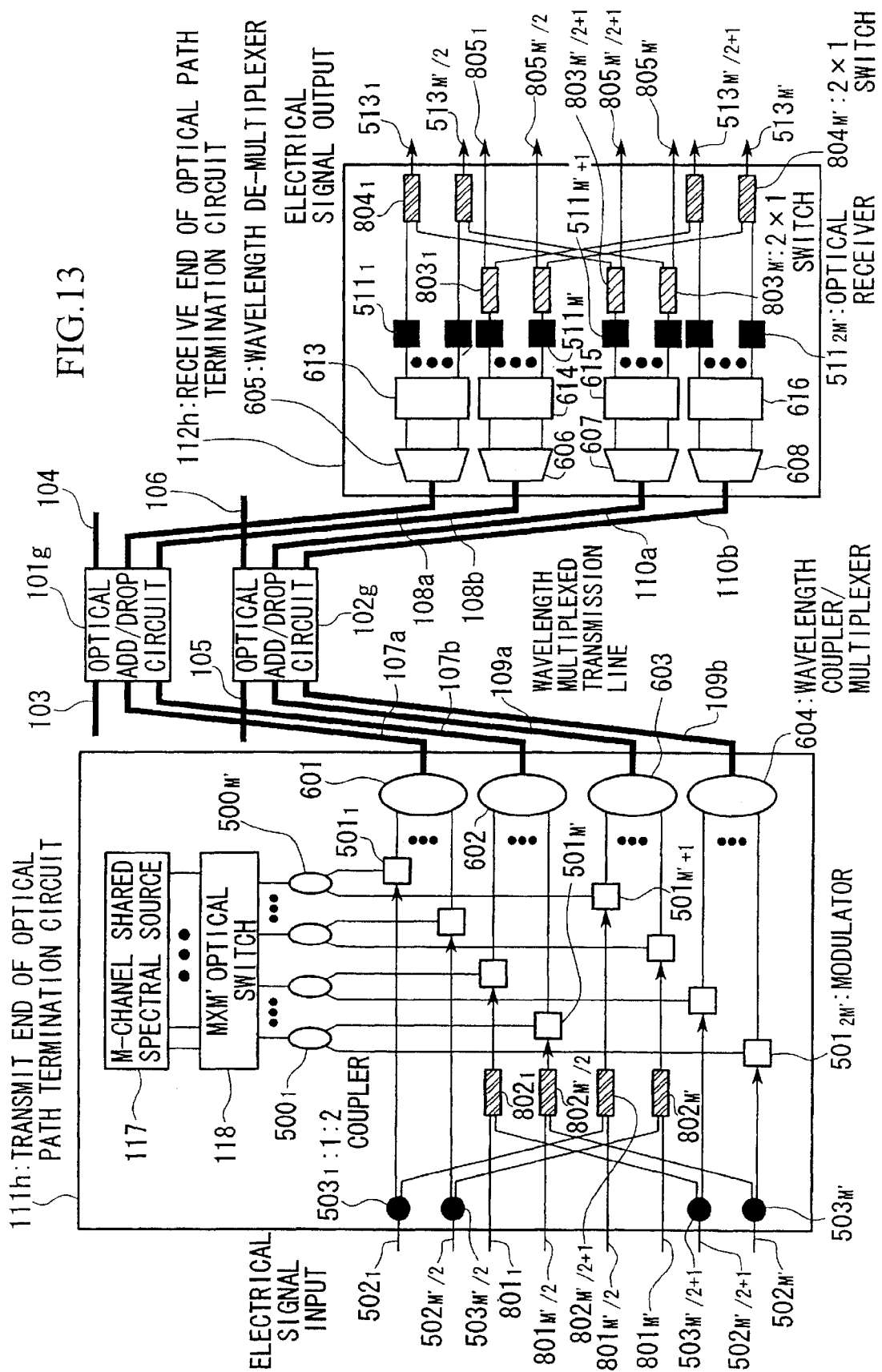
FIG. 13 is a schematic diagram of the WDM ring network in Embodiment 8.
Figure 14:
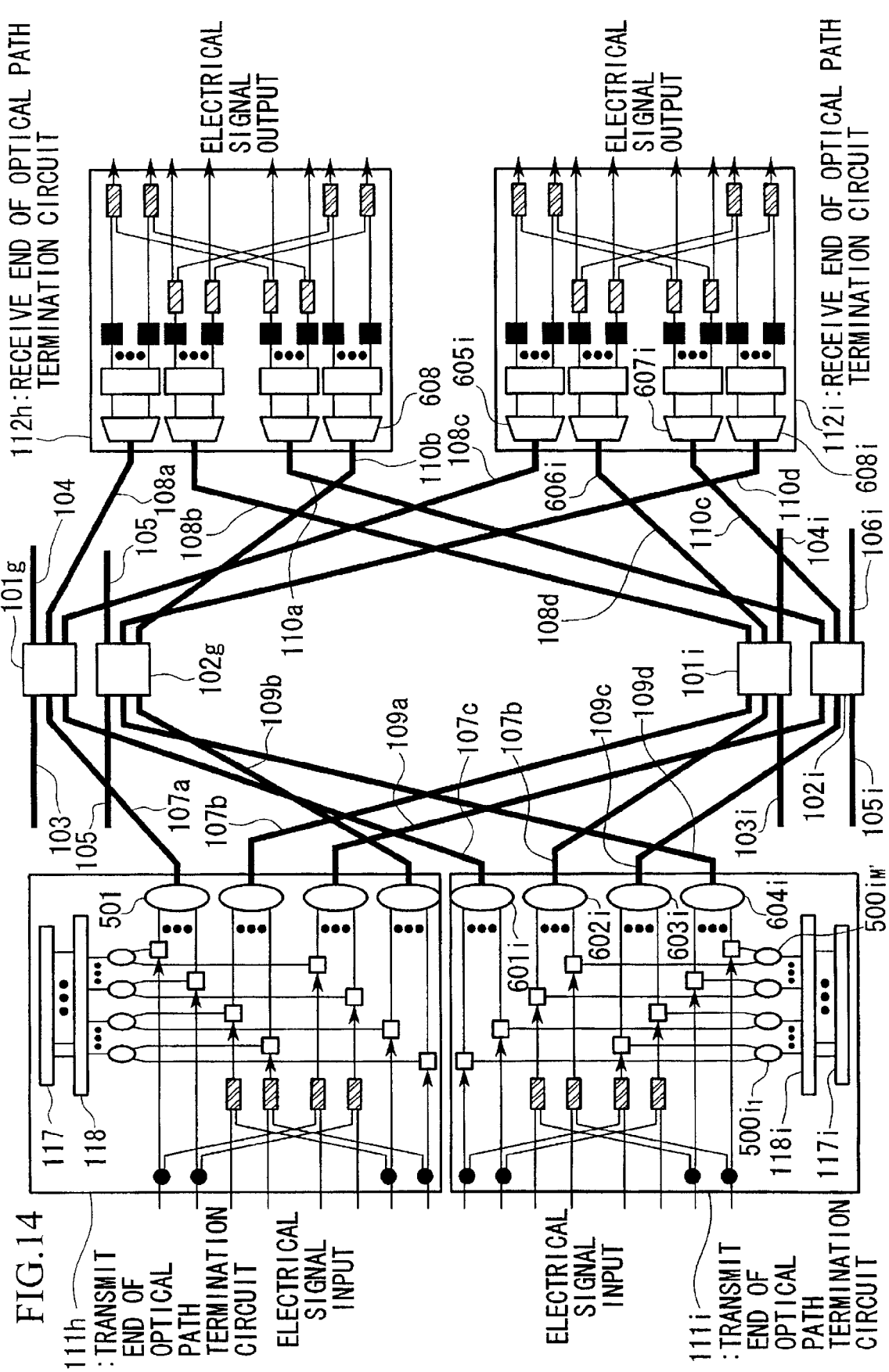
FIG. 14 is a schematic diagram of a modified example of the WDM ring network in Embodiment 8.
Figure 15:
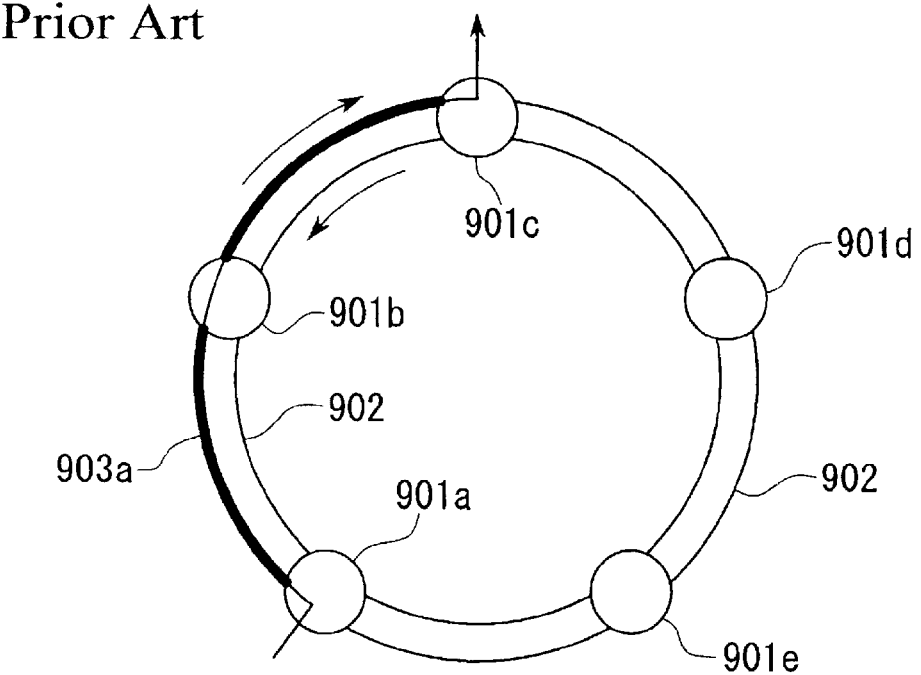
FIG. 15 is a schematic diagram of an example of the conventional WDM ring network.
Figure 16:
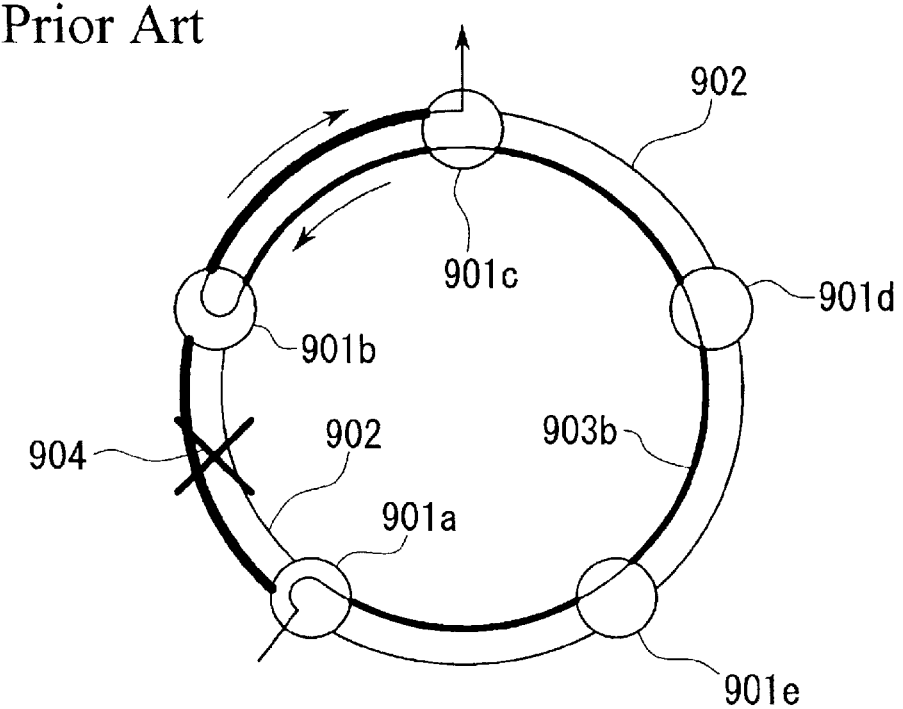
FIG. 16 is a diagram to show the operation of the conventional WDM ring network.
Figure 17:
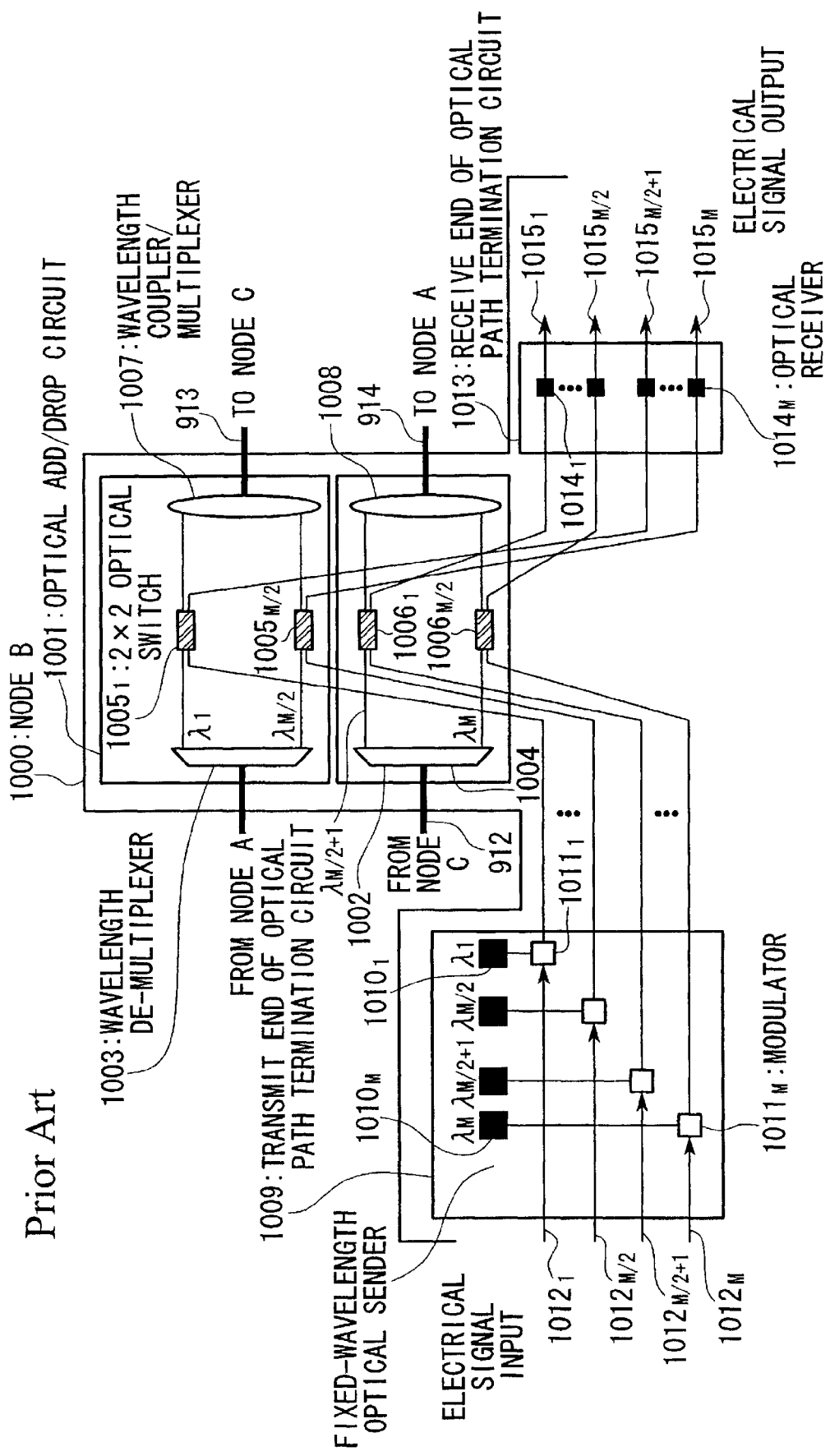
FIG. 17 is a schematic diagram of an example of the conventional WDM ring network.

FIG. 13 and FIG. 14 show a configuration of the WDM network in Embodiment 8, which is obtained by adding the 2F-BR network disclosed in claim 15 to the 2F-BR network disclosed in claim 14 for servicing extra-traffic, so that the combined network operates as a 4F-BR network to meet new demands for communication services.

The OADM circuits 101g, 102g, optical fibers 103~106, transmit end 111h and receive end 112h of the optical path (op) termination circuit constitute a 2F-BR network for supporting the extra-traffic service.

Before the capacity increase is instituted, the optical fibers 107a, 108a are connected to OADM 101g, and the optical fibers 109b, 110b are connected to OADM 102g, and these transmission lines 107a, 108a, 109b, 110b are used for optical paths for multiplexed normal-use waves.

The optical fibers 107b, 108b are connected to OADM 101g, and the optical fibers 109a, 110a are connected to OADM 102g, and these transmission lines 107b, 108b, 109b, 110a are used for optical paths for multiplexed emergency waves.

The transmit end 111h is derived by adding the extra-traffic line to the network presented in Embodiment 7, and is comprised by: a shared light source 117 as a wavelength source; an M×M' switch 118; 1:2 optical couplers $500_1$~$500_{M'}$ for duplicating the selected wavelengths; normal electrical signal input $502_1$~$502_{M'}$ for normal information to be delivered; modulators $501_1$~$501_{M'}$ for superimposing electrical signals to respective waves; 1:2 electrical couplers $503_1$~$503_{M'}$ for duplicating normal information superimposed with normal electrical signals; electrical signal input $801_1$~$801_{M'}$ for extra-traffic information; 2×1 switches $802_1$~$802_{M'}$ for selecting either the normal electrical signals or the extra-traffic electrical signals; and optical couplers 601~604 for multiplexing wavelengths inserted in the OADM. The optical couplers 601~604 are connected to respective Optical fibers 107a, 107b, 109a, 109b for transmitting the waves to be inserted.

The receive end 112h of the op termination circuit is comprised by: wavelength de-multiplexers 605~608; (M/2)×(M'/2) optical switches 613~616 for directing de-multiplexed waves to desired paths; photo-electric converters $511_1$~$511_{M'}$ for converting received optical signals to electrical signals; 1×2 switches $803_1$~$803_{M'}$ for outputting normal information received to electrical signal output $513_1$~$513_{M'}$ and extra-traffic information to electrical signal output $805_1$~$805_{M'}$; and 2×1 switches $804_1$~$804_{M'}$ for selecting one electrical signal from the electrical signals received.

Here, electrical signal input $502_1$~$502_{M'}$ matches with the respective electrical signal output $503_1$~$503_{M'}$ and electrical signal input $801_1$~$801_{M'}$ matches with the respective electrical signal output $805_1$~$805_{M'}$, and their relationship relates to the two bi-directional optical paths operating between the nodes.

Embodiment 9

FIG. 14 shows a configuration of the WDM network which is the 2F-BR of FIG. 13, in which a new 2F-BR which is roughly the same in structure has been added.

The additional 2F-BR ring is comprised by: OADM 101i, 102i; WDM transmission lines 103i~106i to connect the nodes; transmit end 111i; receive end 112i; and WDM transmission lines connecting the OADM 101i, 102i and optical path (op) termination circuits 111i and 112i.

Here, the direction of the signals input in the WDM line 103 to be sent to WDM line 104 and that of the signals input in the WDM line 105i to be sent to WDM line 106i are the same, and the direction of the signals input from the WDM line 105 to be sent to WDM line 106 and that of the signals input in WDM line 103i to be sent to WDM line 104i are the same. These two communication directions represent clockwise and counter-clockwise directions, respectively.

When the network capacity is to be increased, extra-traffic lines contained in the existing network are switched.

Before such a switching process is started, extra-traffic signals are input in the OADM 101g, 102g from the transmit ends 111h, 112h of the op termination circuit through the WDM lines 107b, 109a, as shown in FIG. 13, and from the OADM 101g, 102g to the receive end 112h through the WDM lines 108b, 110a.

Interchanging is carried out as follows: after stopping the network operations temporarily, WDM lines 107b, 108b are connected to the I/O ports of the new OADM 101i, and WDM lines 109a, 110a are respectively connected the I/O ports of the new OADM 102i. When the connection changes are completed, extra-traffic service can be offered again.

During this period of switching of connections, normal operation of the network is continued without interruption by the optical paths contained in the WDM lines 107a, 108a, 109b, 110b.

Then, in order to increase the network capacity, the WDM lines 107c~110d output from the transmit end 111i and the receive end 112i of the op termination circuit in the new installation are connected to OADMs 101g, 102g, 101i, 102i. This switching of connections results in the following service pattern. A half of the M-channels contained in the WDM lines 103~106, 103i~106i are used as either the normal-use waves or extra-traffic use waves, and the remaining M/2 channels contained in the WDM lines 103~106 are used for providing the newly installed normal use service and the remaining M/2 channels contained in the WDM lines 103i~106i are used for providing the newly installed extra-traffic service.

Therefore, in order to superimpose normal information on the M/2 channels that are not used in the WDM lines 103, 106, optical coupler 601i in the transmit end 111i in the optical path termination circuit on the new installation and the input of OADM 110g are connected by the WDM line 107c, while the wavelength de-multiplexer 605i in the receive end 112i of the optical termination circuit and the output of OADM 101g are connected by the WDM line 108c.

Next, in order to superimpose normal information on the M/2 channels that are not used in the WDM lines 105, 106, the optical coupler 604i in the transmit end 111i of the optical path termination circuit on the new installation and the input of OADM 102g are connected by the WDM line 109d, and the wavelength de-multiplexer 608i in the receive end 112i and the output of OADM 102g are connected by the WDM line 110d.

By performing these steps outlined above, only the normal-use waves will be contained in the WDM lines 103~106.

On the other hand, in order to superimpose extra-traffic information on the M/2 channels that are not used in the WDM lines 103i, 104i, the optical coupler 602i in the transmit end 111i of the optical path termination circuit on the new installation and the input of OADM 101i are connected by the WDM line 107d, and the wavelength de-multiplexer 606i in the receive end 112i and the output of the OADM 101i on the new installation are connected by the WDM line 108d.

Next, in order to superimpose extra-traffic information on the M/2 channels that are not used in the WDM lines 105i, 106i, the optical coupler 603i in the transmit end 111i of the optical path termination circuit on the new installation and the input of OADM 102i are connected by the WDM line 109c, and the wavelength de-multiplexer 607i in the receive end 112i and the output of OADM 102i are connected by the WDM line 110c.

By so doing, only the extra-traffic waves are contained in the WDM lines 103i~106i.

In the new installation, the wavelength allocation is carried out in the following manner.

In the 2F-BR ring shown in FIG. 13, before the new installation, each WDM line 103~106 transmits multiplexed signals produced by wavelengths ($\lambda_1 \sim \lambda_M$) in M-channels. In the WDM lines 103, 104, wavelengths ($\lambda_1 \sim \lambda_{M/2}$) are reserved for normal service, and some waves are processed in the OADM 101g, and are transmitted from the OADM 101g to the transmit end 111h and to the receive end 112h through the WDM lines 107a, 108a. Extra-traffic service use wavelengths ($\lambda_{M/2+1} \sim \lambda_M$), some of which are processed by the OADM 101g and are transmitted from the OADM 101g to the transmit end 111h and to the receive end 112h through the WDM lines 107b, 108b.

In the WDM lines 105, 106, $\lambda_1 \sim \lambda_{M/2}$ are allocated to extra-traffic service, and some waves having the same wavelengths as the waves transmitted in the WDM lines 107a, 108a are processed by the OADM 102g and are transmitted from the OADM 102g to the transmit end 111h and to the receive end 112h through the WDM lines 109a, 110a. Normal service uses $\lambda_{M/2+1} \sim \lambda_M$, some of which having the same wavelengths as the waves transmitted in the WDM lines 107b, 108b are processed by the OADM 102g and are transmitted from the OADM 102g to the transmit end 111h and to the receive end 112h through the WDM lines 109b, 110b.

By adopting such a configuration, extra-traffic service is enabled by the addition of a new 2F ring, in which some of the $\lambda_{M/2+1} \sim \lambda_M$ waves in the WDM lines 107b, 108b are processed by the OADM 101i, and some of the $\lambda_1 \sim \lambda_{M/2}$ waves in the WDM lines 109a, 110a are processed by the OADM 102i.

Further, by connecting the transmit end 111i and receive end 112i on the new installation to the OADM 101g, 102g, 101i, 102i, some of the $\lambda_{M/2+1} \sim \lambda_M$ waves, transmitted through the WDM lines 107c, 108c and having the same wavelengths as the waves in the WDM lines 107b, 108b, are used as normal-use waves and are processed in the OADM 101g, while some of the $\lambda_1 \sim \lambda_{M/2}$ waves, transmitted through the WDM lines 109d, 110d and having the same wavelengths as the waves in the WDM lines 107a, 108a, are used as normal-use waves and are processed in the OADM 102g.

Also, some of the $\lambda_1 \sim \lambda_{M/2}$ waves, transmitted through the WDM lines 107d, 108d, and having the same wavelengths as the waves in the WDM lines 107a, 108a are used as extra-traffic waves and are processed in the OADM 101i, while some of the $\lambda_{M/2+1} \sim \lambda_M$ waves transmitted through the WDM lines 109c, 110c and having the same wavelengths as the waves in the WDM lines 107b, 108b, are used as extra-traffic waves and are processed in the OADM 102i.

In the present embodiment, the network is constructed so that transmit end 111i on the new installation has an M-channel shared spectral source 117i and an M×M' optical switch 118i, which are independent of the transmit end 111h, but because the wavelength selected by the new transmit end 111i is the same as the wavelength selected by the transmit end 111h of the existing 2F-BR network, the same results as in the present embodiment can be produced by arranging the network so that the spectral source 117 and M×M' switch 118 in the transmit end 111$h$ are used to select waves to be input in the 1:2 optical couplers $500i_M$–$500i_{M'}$ in the receive end 111$i$ in the optical path termination circuit on the new installation.

Accordingly, the expanded network constructed by adding a 2F-BR ring network of the present invention offers an advantage that the new ring network can be installed without stopping the operations of the existing network. Another advantage is that the after the new installation becomes operative, WDM optical paths can be separated into functional groups such as normal-use lines and emergency-use lines or extra-traffic line while fully supporting the operation of the existing ring network.

The result is that if the level of new service demand is such that a 2F-BR network is sufficient, there is no need to redesign the existing 2F-BR network into a new 4F-BR network so that the utility efficiency of the resulting ring network is high, thereby enabling to offer an economically viable ring-network.

Additionally, by means of the WDM ring network in Embodiments 7 and 8, the following result can be obtained.
(1) When a new installation is added to an existing network, the normal operation line or the emergency operation line is not affected.
(2) Even if the system is not refurbished, it is easy to operate the resulting system economically and efficiently.
(3) If the demand is met by designing a four-fiber bi-directional ring network so as to double the capacity of the existing two-fiber bi-directional ring network, inter-nodal utilization efficiency would be high and operational cost would be low.

What is claimed is:

1. A wavelength division multiplexing ring network, based on a plurality of lines of optical fibers to connect a plurality of nodes into a ring network architecture, using a half of the fibers for operating in a clockwise direction and a remaining half of the fibers for operating in a counter-clockwise direction to form a logical network comprised by signal channels contained in the optical fibers, wherein each node comprises:

a plurality of optical add/drop circuits connected with the adjacent nodes via optical fibers;

a transmit end which comprises:
an optical sender for selecting and outputting optical signals having different wavelengths to be processed within said node; and
a plurality of wavelength multiplexers, respectively connected to said plurality of optical add/drop circuits, for wavelength-multiplexing the optical signals and sending wavelength-multiplexed signals to the optical add/drop circuits; and a receive end which comprises a plurality of wavelength de-multiplexers for receiving wavelength-multiplexed signals which are sent from the optical add/drop circuits and include the different wavelengths to be processed within said node, and de-multiplexing the wavelength-multiplexed signals, wherein the optical add/drop circuits are capable of selecting, for an optical signal of each wavelength used in the wavelength division multiplexing ring network, one of a first mode of receiving the optical signal from an adjacent node and outputting the received signal to the receive end, a second mode of receiving the optical signal from the transmit end and outputting the received signal to an adjacent node, and a third mode of receiving the optical signal from an adjacent node and outputting the received signal to another adjacent node, based on the wavelengths of the optical signals selected and output by the transmit end.

2. A wavelength division multiplexing ring network according to claim 1, wherein said optical sender has a shared spectral source for producing light of a plurality of different fixed-wavelengths; and an optical switching device for selecting the wavelengths to be processed within the node from said different fixed-wavelengths.

3. A wavelength division multiplexing ring network according to claim 2, wherein said shared spectral source is separated into a plurality of shared spectral sources and each shared spectral source emits a plurality of different wavelengths, and said optical switching device includes a plurality of optical switches for connecting the shared spectral sources in parallel and selecting the wavelengths to be processed within the node.

4. A wavelength division multiplexing ring network according to claim 2, wherein the number of said different fixed-wavelengths is the necessary number of wavelengths for connecting the nodes in a full mesh configuration, or greater.

5. A wavelength division multiplexing ring network according to claim 1, wherein said optical sender has a plurality of wavelength tunable optical senders for outputting the optical signals having the different wavelengths to be processed within the node.

6. A wavelength division multiplexing ring network according to claim 1, wherein electrical signals to be superimposed on each of a plurality of freely selected wavelengths are duplicated to produce first electrical signals and second electrical signals, and if a first signal channel modulated with said first electrical signals, having first wavelength and transmitting in one direction is interrupted, said second electrical signals are used to modulate a wavelength identical to said first wavelength to be inserted in an optical add/drop circuit connected to another optical fiber transmitting in opposite direction to said one direction.

7. A wavelength division multiplexing ring network according to claim 6, wherein said network is operating without a fault on an original signal channel, a new signal channel is created by superimposing new electrical signals, different from said electrical signals, on a wavelength identical to said first wavelength, for inserting in an optical add/drop circuit connected to an optical fiber transmitting optical signals in said reverse direction, and when a fault is developed in said network, said new signal channel is interrupted and said original signal channel is restored.

8. A wavelength division multiplexing ring network according to claim 1, wherein each of a plurality of freely selected wavelengths is duplicated to produce first wave signals and second wave signals to be modulated by electrical signals, and if a first signal channel transmitting in one direction and having a first wavelength modulated with said electrical signals is interrupted, said second wave signals are inserted in an optical add/drop circuit connected to another optical fiber transmitting in opposite direction to said one direction.

9. A wavelength division multiplexing ring network according to claim 8, wherein when said network is operating without a fault on an original signal channel, a new signal channel is created by superimposing said second electrical signals on a wavelength identical to said first wavelength, for inserting in an optical add/drop circuit connected to an optical fiber transmitting optical signals in said reverse direction, and when a fault is developed in said network, said new signal channel is interrupted and said original signal channel is restored.

10. A wavelength division multiplexing ring network according to claim 1, wherein said optical add/drop circuit is comprised by an integrated circuit including one device or two devices selected from the group consisting of optical coupler, wavelength multiplexer, wavelength discriminator and wavelength multi/de-multiplexer.

11. A wavelength division multiplexing ring network according to claim 1, wherein any two adjacent nodes are connected by two optical fibers, each of which transmits multiplexed optical signals from one node to other node based on an equal number of normal-use waves and emergency-use waves; and wherein each of said two optical fibers provides either a clockwise transmission or a counter-clockwise transmission of optical signals, and said normal-use waves and said emergency-use waves are combined in such a way that an optical fiber transmitting optical signals in one direction contain one identical set of wave combinations for all node connections, while a set of normal-use waves in one direction is used as a set of emergency-use waves in opposite direction, and vice versa.

12. A wavelength division multiplexing ring network according to claim 11, wherein transmission lines are allocated to separate said normal-use waves and said emergency-use waves propagating in signal channels connecting said optical add/drop circuits to said transmit end, and in signal channels connecting said optical add/drop circuits to said receive end.

13. A wavelength division multiplexing ring network according to claim 11, wherein, when said network is operating normally, said emergency-use waves are superimposed with information different from information transmitted during normal operation.

14. A wavelength division multiplexing ring network according to claim 11, wherein a plurality of wavelength multiplexing networks are cross connected to form an enlarged optical communication network.

15. A wavelength division multiplexing ring network according to claim 14, wherein a plurality of wavelength multiplexing networks are cross connected according to a four-fiber ring, network architecture.

16. A wavelength division multiplexing ring network according to claim 14, wherein a plurality of wavelength multiplexing networks are cross connected in such a way that one network being connected to other network will not disrupt optical communication in said other network.

* * * * *

UNITED STATES PATENT AND TRADEMARK OFFICE
CERTIFICATE OF CORRECTION

PATENT NO. : 6,626,590 B1
DATED : September 30, 2003
INVENTOR(S) : Naohide Hagatsu and Masafumi Koga It is certified that error appears in the above-identified patent and that said Letters Patent is hereby corrected as shown below:

Column 1,
Line 30, between "lines" and "an", please replace "," with -- ; --;
Line 32, between "902" and "and", please replace "," with -- ; --;

Column 3,
Line 41, between "network" and "optical", please replace "," with -- ; --;

Column 4,
Line 37, between "nodes" and "901$b$", please replace "$^{901}\alpha$" with -- 901α --;

Column 11,
Line 34, between "where" and "for", please replace "(M≥M≥N-1)" with --(M≥M≥N-1)--;

Column 12,
Line 66, between "M-channels" and "optical", please replace "," with -- ; --;

Column 13,
Line 2, between "information" and "optical", please replace "," with -- ; --;
Line 45, between "wavelengths" and "α", please replace "," with -- ; --;
Line 49, between "waves" and "an", please replace "," with -- ; --;

Column 14,
Line 1, between "waves" and "an", please replace "," with -- ; --;

Column 16,
Line 17, between "$512_M$" and "selecting", please insert -- for --;

UNITED STATES PATENT AND TRADEMARK OFFICE
CERTIFICATE OF CORRECTION

PATENT NO.    : 6,626,590 B1
DATED         : September 30, 2003
INVENTOR(S)   : Naohide Hagatsu and Masafumi Koga It is certified that error appears in the above-identified patent and that said Letters Patent is hereby corrected as shown below:

<u>Column 22,</u>
Line 25, between "118" and "M×M", please replace "$(M \geq M' \geq N-1)$" with --$(M \geq M' \geq N-1)$--;

Line 36, between "616" and "photo-electric", please replace "$(M \geq M' \geq N-1)$" with --$(M \geq M' \geq N-1)$--;

Line 55, between "use" and "In", please replace "," with -- i --.

Signed and Sealed this

Twenty-second Day of June, 2004

JON W. DUDAS
*Acting Director of the United States Patent and Trademark Office*